United States Patent
Yasumoto et al.

(10) Patent No.: US 7,913,268 B2
(45) Date of Patent: Mar. 22, 2011

(54) MOTOR AND MANUFACTURING METHOD OF THE SAME

(75) Inventors: Nobuaki Yasumoto, Kyoto (JP); Takuya Yamane, Kyoto (JP)

(73) Assignee: Nidec Corporation, Kyoto (JP)

( * ) Notice: Subject to any disclaimer, the term of this patent is extended or adjusted under 35 U.S.C. 154(b) by 777 days.

(21) Appl. No.: 11/753,981

(22) Filed: May 25, 2007

(65) Prior Publication Data

US 2007/0277189 A1 Nov. 29, 2007

(30) Foreign Application Priority Data

May 29, 2006 (JP) ................................. 2006-148170

(51) Int. Cl.
*G11B 19/20* (2006.01)
*H02K 7/00* (2006.01)

(52) U.S. Cl. ................. 720/695; 310/67 R; 310/156.26; 720/710

(58) Field of Classification Search .................. 720/710, 720/715, 695; 360/99.08, 99.11; 310/67 R, 310/156.26

See application file for complete search history.

(56) References Cited

U.S. PATENT DOCUMENTS

| | | | |
|---|---|---|---|
| 4,705,279 A | 11/1987 | Mizukami et al. | |
| 4,786,997 A | 11/1988 | Funabashi et al. | |
| 4,841,517 A | 6/1989 | Kurihara et al. | |
| 5,646,934 A | 7/1997 | Mizuno et al. | |
| 5,751,688 A | 5/1998 | Mizuno et al. | |
| 6,118,747 A | 9/2000 | Van Rosmalen | |
| 6,208,613 B1 | 3/2001 | Iizuka | |
| 6,353,591 B1 | 3/2002 | Kato | |
| 7,015,611 B2* | 3/2006 | Tokunaga et al. | 310/90 |
| 7,461,391 B2 | 12/2008 | Yoo | |
| 2001/0038250 A1* | 11/2001 | Katagiri et al. | 310/67 R |
| 2002/0084704 A1* | 7/2002 | Fukutani et al. | 310/67 R |
| 2004/0154036 A1* | 8/2004 | Saito | 720/697 |
| 2004/0232781 A1 | 11/2004 | Yoo | |
| 2005/0223400 A1 | 10/2005 | Matsushita et al. | |
| 2006/0022621 A1 | 2/2006 | Mine et al. | |
| 2006/0087184 A1* | 4/2006 | Kuyama et al. | 310/90 |

(Continued)

FOREIGN PATENT DOCUMENTS

CN 1233828 A 11/1999

(Continued)

OTHER PUBLICATIONS

Amendment under 37 CFR 1.111 dated Jun. 2, 2010 filed in response to US Office Action dated Mar. 8, 2010, issued in U.S. Appl. No. 11/491,965, pp. 1-23 along with 2 sheets of replacement drawings.

(Continued)

*Primary Examiner* — Julie Anne Watko
(74) *Attorney, Agent, or Firm* — Westerman, Hattori, Daniels & Adrian, LLP

(57) ABSTRACT

A motor is provided with a chucking device enabling attachment and detachment of a disk-shaped storage medium. In the motor, a turntable forming a portion of the chucking device is disposed axially above a rotor holder. The turntable has a placement portion on which the storage medium is placed. An inner recess is formed on an outer surface of a shaft between a position at which the rotor holder is fitted and another position at which the turntable is fitted. An outer recess is formed to radially face the inner recess and is concave away from a center axis. Adhesive is placed in the inner recess and the outer recess.

23 Claims, 20 Drawing Sheets

U.S. PATENT DOCUMENTS

| | | | |
|---|---|---|---|
| 2006/0284497 A1* | 12/2006 | Takaki et al. | 310/51 |
| 2007/0013239 A1* | 1/2007 | Park | 310/51 |
| 2007/0028255 A1 | 2/2007 | Ito et al. | |
| 2007/0061827 A1* | 3/2007 | Dupper et al. | 720/695 |
| 2007/0150911 A1 | 6/2007 | Kim | |
| 2007/0294712 A1 | 12/2007 | Ito et al. | |

FOREIGN PATENT DOCUMENTS

| | | |
|---|---|---|
| CN | 1585013 A | 2/2005 |
| JP | 61-28138 U | 2/1986 |
| JP | 63-65154 U | 4/1988 |
| JP | 63-168653 U | 11/1988 |
| JP | 63-195654 U | 12/1988 |
| JP | 6-33569 Y2 | 8/1994 |
| JP | 7-18044 Y2 | 4/1995 |
| JP | 7-336929 A | 12/1995 |
| JP | 9-182362 A | 7/1997 |
| JP | 10-134462 A | 5/1998 |
| JP | 63-72750 U | 5/1998 |
| JP | 11-4568 A | 1/1999 |
| JP | 2000-83346 A | 3/2000 |
| JP | 2000-90557 A | 3/2000 |
| JP | 2000-113544 A | 4/2000 |
| JP | 2000-187930 A | 7/2000 |
| JP | 2000-200454 A | 7/2000 |
| JP | 2000-285557 A | 10/2000 |
| JP | 2002-61636 A | 2/2002 |
| JP | 2002-148134 A | 5/2002 |
| JP | 2002-333053 A | 11/2002 |
| JP | 2002-343017 A | 11/2002 |
| JP | 2003-36584 A | 2/2003 |
| JP | 2004-30744 A | 1/2004 |
| JP | 2004-64865 A | 2/2004 |
| JP | 2004-079111 A | 3/2004 |
| JP | 2004-110919 A | 4/2004 |
| JP | 2004-234773 A | 8/2004 |
| JP | 2006-050738 A | 2/2006 |
| JP | 2006-149052 A | 6/2006 |

OTHER PUBLICATIONS

Chinese Office Action dated Nov. 27, 2009 issued in Chinese Application No. 200610107859.8.

Chinese Office Action dated Nov. 30, 2007 issued in Chinese Application No. 200610107859.8.

Preliminary Amendment dated Jun. 2, 2010 filed in U.S. Appl. No. 11/765,493, pp. 1-38 along with 3 sheets of new drawings.

Supplemental Amendment under 37 CFR 1.111 dated Sep. 22, 2010 filed in response to US Office Action dated Mar. 8, 2010 issued in U.S. Appl. No. 11/491,965, pp. 1-20.

US Office Action dated Mar. 8, 2010, issued in corresponding U.S. Appl. No. 11/491,965.

Non-Final Office Action dated Nov. 29, 2010, issued in U.S. Appl. No. 11/765,493, pp. 1-39.

Final Office Action dated Dec. 9, 2010, issued in U.S. Appl. No. 11/491,965, pp. 1-9.

* cited by examiner

MOTOR AND MANUFACTURING METHOD OF THE SAME

BACKGROUND OF THE INVENTION

1. Field of the Invention

The present invention relates to a motor provided with a turntable and a method for manufacturing the motor. More particularly, the present invention relates to a motor provided with a chucking device which enables attachment and detachment of a disk-shaped storage medium such as CD or DVD.

2. Description of the Related Art

Reduction in size and height of optical storage devices using disk-shaped storage media such as CDs and DVDs has been demanded in recent years. To keep up with this demand, motors provided with chucking devices each enabling attachment and detachment of an optical storage medium are required to be improved in the following two aspects. First, reduction in size and height is also required for motors with the reduction in size and height of optical storage devices into which motors are incorporated. Second, motors have to have improved impact resistance. This request occurs because optical storage devices into which motors are incorporated are often carried due to the reduction in size and height thereof. In order to satisfy the second request, it is necessary to increase securing strength between the respective components of motors. In particular, a shaft to which a load is applied during an operation of the motor, a rotor holder which holds a rotor magnet and is subjected to a driving force, and a turntable on which an optical storage medium is mounted have to be strongly secured to one other.

In accordance with conventional techniques, the shaft, the rotor holder, and the turntable are bonded to one other with adhesive. FIG. 19 illustrates an exemplary manner of bonding the rotor holder and the turntable to the shaft with adhesive.

Referring to FIG. 19, the rotor holder 360 is hollow, approximately cylindrical and has a bottom. At the center of the bottom is formed a through hole. The turntable 320, which is approximately disk-shaped, also has a through hole at its center. Hereinafter, the through hole of the rotor holder 360 and the through hole of the turntable 320 are referred to as the rotor-holder through hole and the turntable through hole, respectively, for the sake of convenience. The shaft 310 penetrates through both the through holes of the rotor holder 360 and the turntable 320. The bottom of the rotor holder 360 is in contact with the turntable 320. Adhesive is applied on an outer surface of the shaft 310, an inner circumferential surface of the rotor holder 360 which defines the rotor-holder through hole, and an inner circumferential surface of the turntable 320 which defines the turntable through hole. Also, adhesive is applied on surfaces of the rotor holder 360 and the turntable 320, which are in contact with each other. The applied adhesive is then solidified, thereby securing the shaft 310, the rotor holder 360, and the turntable 320 to one another. As described above, the rotor holder 360 and the turntable 320 to the shaft 310 are secured with adhesive to one another in accordance with the conventional technique.

When the aforementioned conventional technique is used, an area of adhesion has to be increased in order to increase the strength of securing the rotor holder and the turntable to the shaft. In order to increase the area of adhesion, it is necessary to increase the diameter or axial length of the shaft. However, both the increase in diameter of the shaft and the increase in axial length of the shaft make the reduction in size and height of the motor difficult.

That is, when the aforementioned conventional securing structure continues to be used, the recent demands for increasing the strength of securing the rotor holder and the turntable to the shaft cannot be satisfied. Thus, a novel securing structure for securing the shaft, the turntable, and the rotor holder to one another is required which satisfies both the demands for the reduction in height of the motor and the demands for increasing the securing strength.

SUMMARY OF THE INVENTION

According to a preferred embodiment of the present invention, a motor is provided with a chucking device which enables attachment and detachment of a disk-shaped storage medium having a center opening. The motor includes a shaft coaxial with a predetermined center axis and a rotor magnet integrally rotatable with the shaft. The motor includes a rotor holder having a fitting bore and a hollow, approximately cylindrical portion. The shaft is fitted into the fitting bore. The rotor magnet is attached to the hollow, approximately cylindrical portion. The motor also includes a turntable disposed axially above the rotor holder. The turntable forms a portion of the chucking device and has a displacement portion on which the disk-shaped storage medium is placed. The turntable has a securing bore to which the shaft is fitted. On an outer surface of the shaft, an inner recess which is concave toward the center axis is formed between an axially lower end of the fitting bore and an axially upper end of the securing bore. In the motor, an outer recess is formed to at least partially face the inner recess in a radial direction substantially perpendicular to the center axis. The outer recess is concave away from the center axis. Adhesive is placed in the inner recess and the outer recess.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
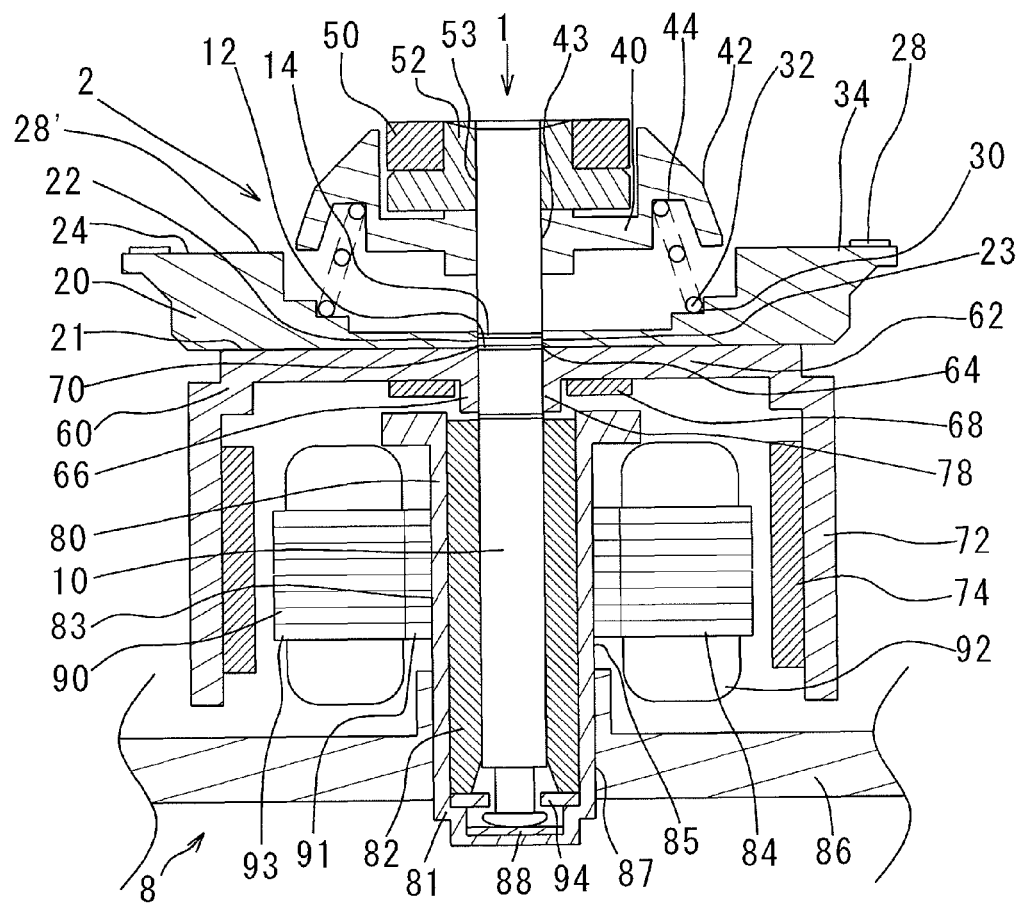
FIG. 1 is a cross-sectional view of a motor according to a first preferred embodiment of the present invention.

Referring to FIGS. 1 through 18, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. In the drawings, like parts are given like reference numerals and chain-dotted line indicates a portion in which adhesive is placed. Meanwhile, in the following description, an axial direction indicates a direction parallel to a rotation axis, and a radial direction indicates a direction perpendicular to the rotation axis.

Figure 2:
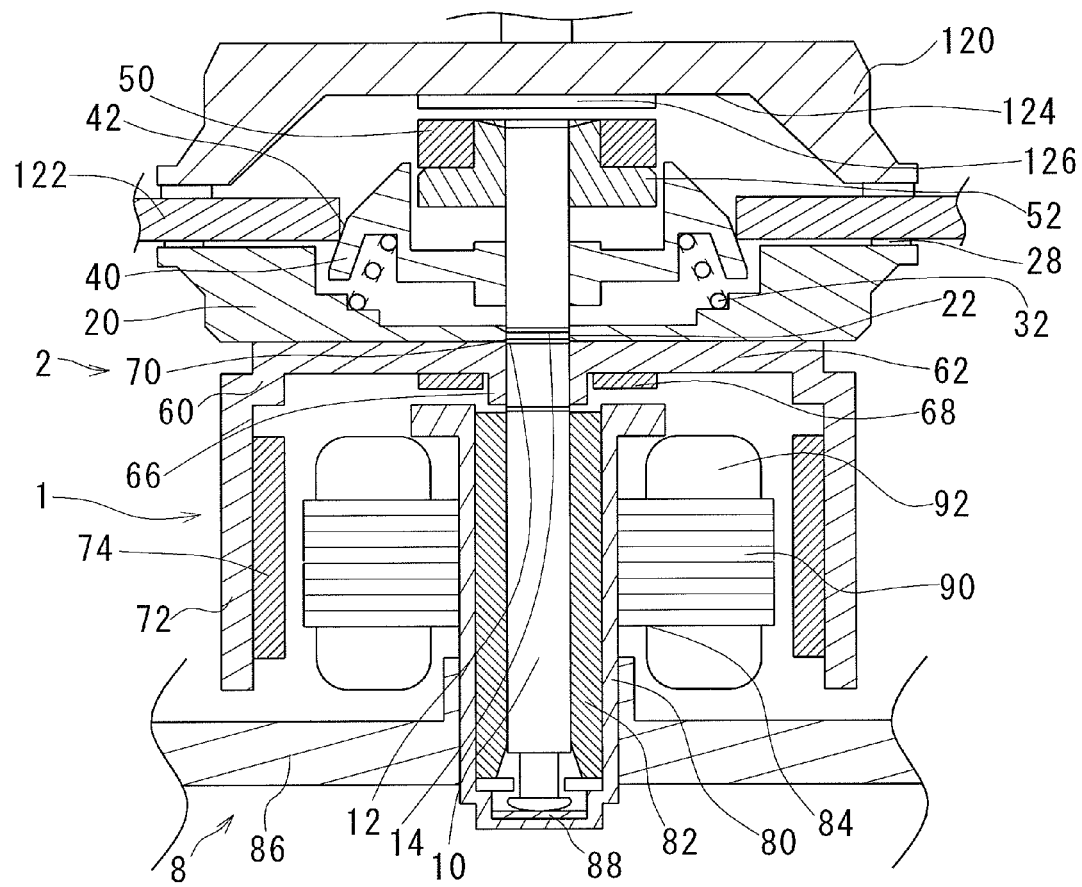
FIG. 2 is a cross-sectional view of the motor of FIG. 1 with an optical disc placed thereon.

FIG. 1 is a cross-sectional view of a motor according to a first preferred embodiment of the present invention. FIG. 2 is a cross-sectional view of the motor of FIG. 1 when an optical disc as an exemplary disk-shaped storage medium is placed.

Referring to FIG. 1, the motor 1 includes a rotating assembly 2 and a stationary assembly 8. The rotating assembly 2 includes a shaft 10, a turntable 20, a cone member 40, and a rotor holder 60. The stationary assembly 8 includes a housing 80, a sleeve 92, a stator 84, a base plate 86, and a thrust plate 88.

The stationary assembly 8 is now described. The housing 80 is a hollow, approximately cylindrical member having a bottom. A stepped portion 81 is provided an axially lower portion of the housing 80 so as to projects axially downward and radially inward. The housing 80 is inserted into a motor-securing hole 87 provided in the base plate 86 by press fitting, so that the outer surface 85 of the housing 80 is in contact with and secured to a surface of the base plate 86 defining the motor-securing hole 87. In this preferred embodiment, the housing 80 is made of magnetic material and is formed by pressing.

A washer 94 is an approximately circular disk having an opening at its center and is in contact with an axially upper surface of the stepped portion 81 of the housing 80 in FIG. 1. The sleeve 82 in the form of a hollow, approximately cylindrical member is fitted into the housing 80 to be in contact with the inner surface 83 of the housing 80. In this preferred embodiment, the sleeve 82 is made of porous material and impregnated with oil, for example. An axially lower end of the sleeve 82 in FIG. 1 is in contact with the washer 94. The washer 94 is sandwiched and secured between the stepped portion 81 of the housing 80 and the axially lower end of the sleeve 82.

The thrust plate 88 is an approximately circular disk and is disposed on the bottom of the housing 80 to be in contact therewith. The thrust plate 88 is preferably made of sliding material having good abrasion resistance, e.g., polyetheretherketone resin (PEEK).

In the stator 84, a stator core 90 is provided which includes an annular core back portion 91 and a plurality of teeth 93 extending from the core back portion 91 radially outward. The inner circumferential surface of the core back portion 91 is fitted to the outer surface of the housing 80. A coil 92 is wound around each tooth 93 of the stator core 90. The stator core 90 and the coil 92 form together the stator 84.

The rotating assembly 2 is now described. The shaft 10 is placed in the inside of the sleeve 82 to be coaxial with a predetermined center axis. The shaft 10 is preferably made of hard material, e.g., stainless. An axially lower end of the shaft 10 is arc-shaped, as seen from the radial direction. The axially lower end of the shaft 10 is in contact with the axially upper surface of the washer 94 at a point.

The rotor holder 60 is a hollow, approximately cylindrical member with a lid 62 and is preferably formed by pressing. The rotor holder 60 has a fitting bore 78 at the center of the lid 62. The fitting bore 78 is formed by burring to axially penetrate through the lid 62. Since the fitting bore 78 is formed by burring, an extending portion 66 extending from the lid 62 axially downward is formed. An axially upper side of the extending portion 66 continues to a bent portion 64 (see FIG. 3) which is bent radially outward to continue to the lid 62. The inner surface of the extending portion 66 and the bent portion 64 serve as a surface defining the bore 78.

The turntable 20 is a hollow, approximately cylindrical member. The turntable 20 has a bottom portion 21 having an axially lower surface which is substantially flat and perpendicular to the center axis. At the center of the bottom portion 21 is provided a securing bore 22 which axially penetrates through the bottom portion 21. A stepped portion 30 extends from a radially outer portion of the bottom portion 21 upward in FIG. 2. An outer peripheral portion 34 extends from the stepped portion 30 radially outward and axially upward. The outer peripheral portion 34 has an upper end surface which is substantially flat.

Into the securing bore 22 is inserted the shaft 10. An inner circumferential surface of the turntable 20 defining the securing bore 22 is in contact with and secured to the shaft 10. Hereinafter, this surface is referred to as a fitting surface 23. An axially lower portion of the fitting surface 23 is chamfered to form a chamfered portion 24.

A placement member 28 is attached to the upper end surface of the outer peripheral portion 34 of the turntable 20, for example, by bonding. In this preferred embodiment, the turntable 20 is made of resin and is formed by injection molding, for example. The placement member 28 is made of elastic material such as rubber.

With this configuration, the rotor holder 60 is secured to the shaft 10 by press-fitting the shaft 10 into the fitting bore 78 of the rotor holder 60 and bonding the outer surface of the shaft 10 to inner surface of the extending portion 66 of the rotor holder 60. The turntable 20 is secured to the shaft 10 by press-fitting the shaft 10 into the securing bore 22 of the turntable 20 and bonding the outer surface of the shaft 10 to the fitting surface 23. The turntable 20 is located axially above the lid 62 of the rotor holder 60.

The cone member 40 includes a centering portion 42 having a conical surface, a through hole 43 provided at the center of the centering portion 42 in the radial direction, and a concave portion 44 to be in contact with a coil spring 32 described later. The inner diameter of the through hole 43 of the cone member 40 is set to be slightly larger than the outer diameter of the shaft 10. Into the inside of the through hole 43 of the cone member 40 is inserted an axially upper portion of the shaft 10. A sliding agent is applied on the inner surface of the centering portion 42 which defines the through hole 43. Since the diameter of the through hole 43 of the cone member 40 is larger than that of the shaft 10 and the sliding agent is applied on the surface defining the through hole 43, the cone member 40 is freely movable in the axial direction relative to the shaft 10 while the shaft 10 penetrates through the through hole 43.

The coil spring 32 is disposed such that its axially lower portion is in contact with the stepped portion 30 of the turntable 20 and its axially upper portion is in contact with the concave portion 44 of the cone member 40. The coil spring 32 applies a force to the turntable 20 and the cone member 40 to move them away from each other in the axial direction.

A chucking yoke 52 is located axially above the through hole 43 of the cone member 40. The chucking yoke 52 is an approximately circular plate having a center bore 53. The inner surface of the chucking yoke 52, which defines the center bore 53, is secured to the outer surface of the shat 10 by press fitting. That is, the chucking yoke 52 is secured to the shaft 10. A chucking magnet 50 is bonded and secured to an axially upper portion of the chucking yoke 52. Since the chucking yoke 52 is secured to the shaft 10, the chucking yoke 52 prevents axially upward separation of the cone member 40 which is forced axially upward by the coil spring 32 and is axially movable.

When electric current flows through the coil 92, a magnetic field is generated around the stator 84 and therefore magnetic interaction between the stator 84 and the rotor magnet 74 rotates the rotating assembly 2. A radial load applied to the rotating assembly 2 is supported by the sleeve 82 via the shaft 10. A thrust load applied to the rotating assembly 2 is supported by the thrust plate 88 via the shaft 10. Thus, the rotating assembly 2 is supported in a rotatable manner relative to the stationary assembly 8.

A preload magnet 68 is secured to the lower surface of the lid 62 of the rotor holder 60. The preload magnet 68 is preferably a rare earth magnet, for example. The preload magnet 68 axially attracts the housing 80 by its magnetic attracting force. In other words, the preload magnet 80 forces the rotor holder 60 downward in the axial direction. Moreover, the preload magnet 68 brings the axially lower end of the shaft 10 into contact with the thrust plate 88. Furthermore, the preload magnet 68 stabilizes rotation of the rotating assembly 2.

FIG. 2 is a cross-sectional view of the motor 1 of this preferred embodiment, in which an optical disc as an exemplary disk-shaped storage medium placed on the motor 1 is also shown.

Referring to FIG. 2, a clamping member 120 is located axially above the motor 1. The clamping member 120 has a concave portion 124 which faces the motor 1 and is concave away from the motor 1. The clamping member 120 is provided in a disk drive (not shown), for example, so as to be rotatable together with rotation of the shaft 10. The clamping member 120 has approximately the same outer diameter as the turntable 20. The concave portion 124 of the clamping member 120 has an inner surface which has a larger diameter than the cone member 40. A clamp yoke 126, preferably made of magnetic material, is disposed radially inside of the concave portion 124 so as to face the chucking magnet 50 disposed on the chucking yoke 52.

An optical disc 122 having an opening at its center is placed on the placement member 28 in the following manner.

First, the optical disc 122 is moved by means of a tray (not shown) to a position axially above the motor 1. The inner peripheral surface of the optical disc 122, which defines the center opening, is brought into contact with the centering portion 42. The clamp yoke 126 of the clamping member 120 is attracted by the chucking magnet 50, so that the clamping member 120 comes into contact with the upper surface of the optical disc 122 and presses the optical disc 122 axially downward. The optical disc 122 is then moved axially downward with its inner peripheral surface in contact with the centering portion 42, together with the cone member 40. Thus, the optical disc 122 is placed coaxially with the shaft 10. At the same time, the coil spring 32 disposed between the cone member 40 and the turntable 20 is compressed. The optical disc 122 is then moved further downward in the axial direction until it's the lower surface comes into contact with the upper surface of the placement member 28. In this manner, the optical disc 122 is placed coaxially with the shaft 10 and secured to the turntable 20.

Figure 3:
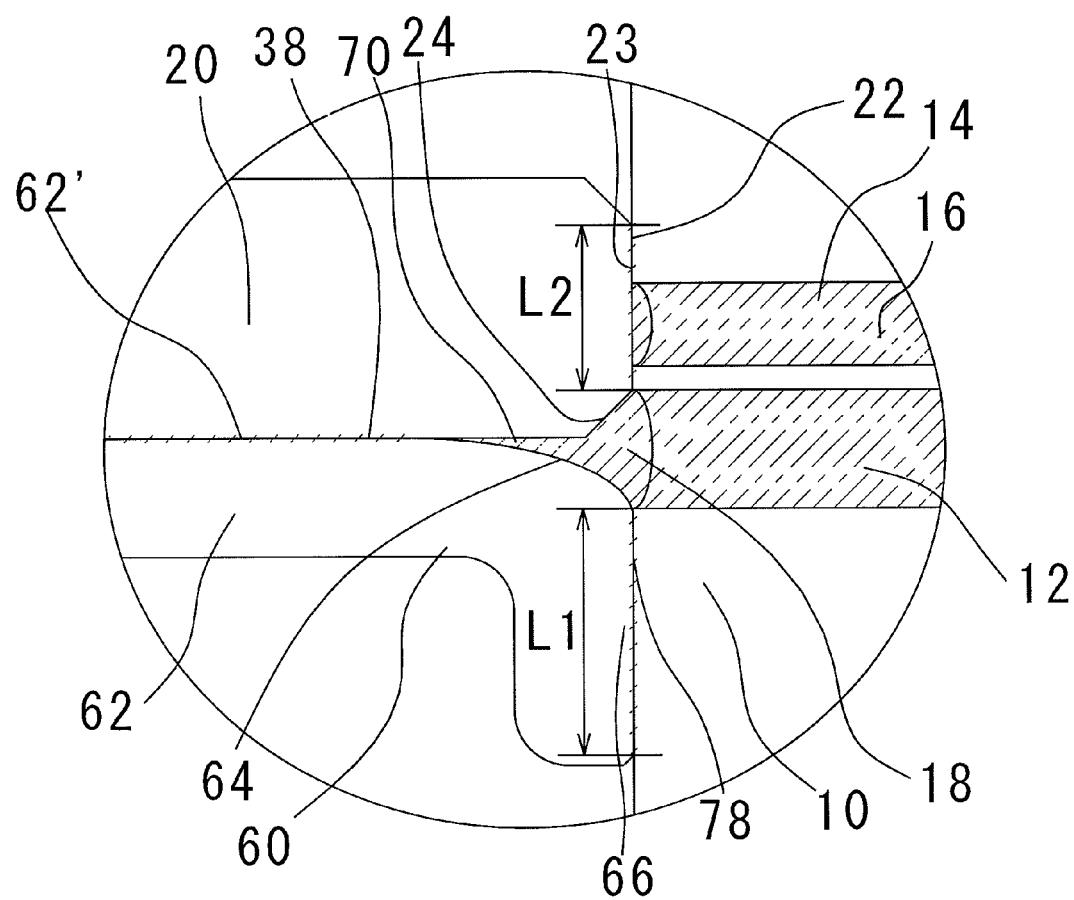
FIG. 3 is an enlarged view of a main part of the motor of FIG. 1.

FIG. 3 is an enlarged view of a main part of the motor 1 of this preferred embodiment.

The structure for securing the shaft 10, the turntable 20, and the rotor holder 60 to one another is now described, referring to FIG. 3. In FIG. 3, adhesive is applied in a portion hatched with long dashed dotted line.

Referring to FIG. 3, a recess 12 is formed on the outer surface of the shaft 10 over its substantially entire circumferential length. The recess 12 is concave toward the center axis. The recess 12 is formed by cutting the outer surface of the shaft 10, for example.

The lid 62 of the rotor holder 60, located outside of the bent portion 64 in the radial direction, is in contact with and opposed to the lower surface of the bottom portion 21 of the turntable 20. The surface of the bent portion 64 of the rotor holder 60 and the chamfered portion 24 of the turntable 20 form together an outer recess 70 which is concave away from the shaft 10 in the radial direction. The outer recess 70 at least partly faces the recess 12 (hereinafter, referred to as the inner recess 12) in the radial direction.

Adhesive 16 is in a space defined by the outer recess 70 and the inner recess 12. Hereinafter, this space is referred to as an adhesive space 18. Most of the adhesive 16 is solidified in the adhesive space 18.

The adhesive 16 has a certain axial thickness on the fitting surface 23 of the turntable 20 and the extending portion 66 of the rotor holder 60. The adhesive 16 also has a width substantially equal to the total of the depth of the inner recess 12 from the outer surface of the shaft 10 toward the center axis and the depth of the outer recess 70 in the radial direction. That is, the adhesive 16 solidified in the adhesive space 18 has a certain radial width and spreads on both sides of the outer surface of the shaft 10, the fitting surface 23 of the turntable 20, and the extending portion 66 of the rotor holder 60 in the radial direction.

With this configuration, the adhesive 16 prevents axial movement of each of the shaft 10, the turntable 20, and the rotor holder 60 away from the others, even if shear stress is applied between the outer surface of the shaft 10 and the fitting surface 23 of the turntable 20 and between the outer surface of the shaft 10 and the inner surface of the extending portion 66 of the rotor holder 60. Moreover, the axial thickness of the adhesive 16 becomes the maximum between the outer surface of the shaft 10, and the fitting surface 23 and the inner surface of the extending portion 66. Thus, a layer of the adhesive 16 cannot be easily broken by shear stress acting between the outer surface of the shaft 10 and the fitting surface 23 and between the outer surface of the shaft 10 and the inner surface of the extending portion 66. Accordingly, separation strength of the shaft 10, i.e., strength against separation of the shaft 10 from the turntable 20 and the rotor holder 60 is increased.

In this state, the outer surface of the shaft 10 is in contact with the fitting surface 23 of the turntable 20. Also, the outer surface of the shaft 10 is in contact with the inner circumferential surface of the extending portion 66 of the rotor holder 60.

A number of minute concave and convex portions are formed on the surface of each of the shaft 10, the turntable 20, and the rotor holder 60. Thus, a plurality of minute gaps are formed between the outer surface of the shaft 10 and the fitting surface 23 of the turntable 20 and between the outer surface of the shaft 10 and the inner surface of the extending portion 66 of the rotor holder 60 due to the presence of the concave and convex portions.

A portion of the adhesive 16 placed in the space 18 enters into minute gaps formed between the outer surface of the shaft 10, and the fitting surface 23 of the turntable 20 and the inner surface of the extending portion 66 of the rotor holder 60. The portion of the adhesive 16 is solidified there. Thus, the strength for securing the turntable 20 and the rotor holder 60 to the shaft 10 is increased.

In this preferred embodiment, an auxiliary groove 14 is provided on the outer surface of the shaft 10 in a portion fitted to the fitting surface 23 of the turntable 20. The adhesive 16 is placed in a space formed by the auxiliary groove 14 and the fitting surface 23 of the turntable 20, too. The adhesive 16 in this space also secures the shaft 10 and the turntable 20 to each other. A portion of the adhesive 16 placed in the auxiliary groove 14 enters between a portion of the outer surface of the shaft 10 where no groove is formed and the fitting surface 23 of the turntable 20, and is solidified there. This portion of the adhesive 16 also contributes to increase in the strength for securing the shaft 10 and the turntable 20 to each other.

Figure 4:
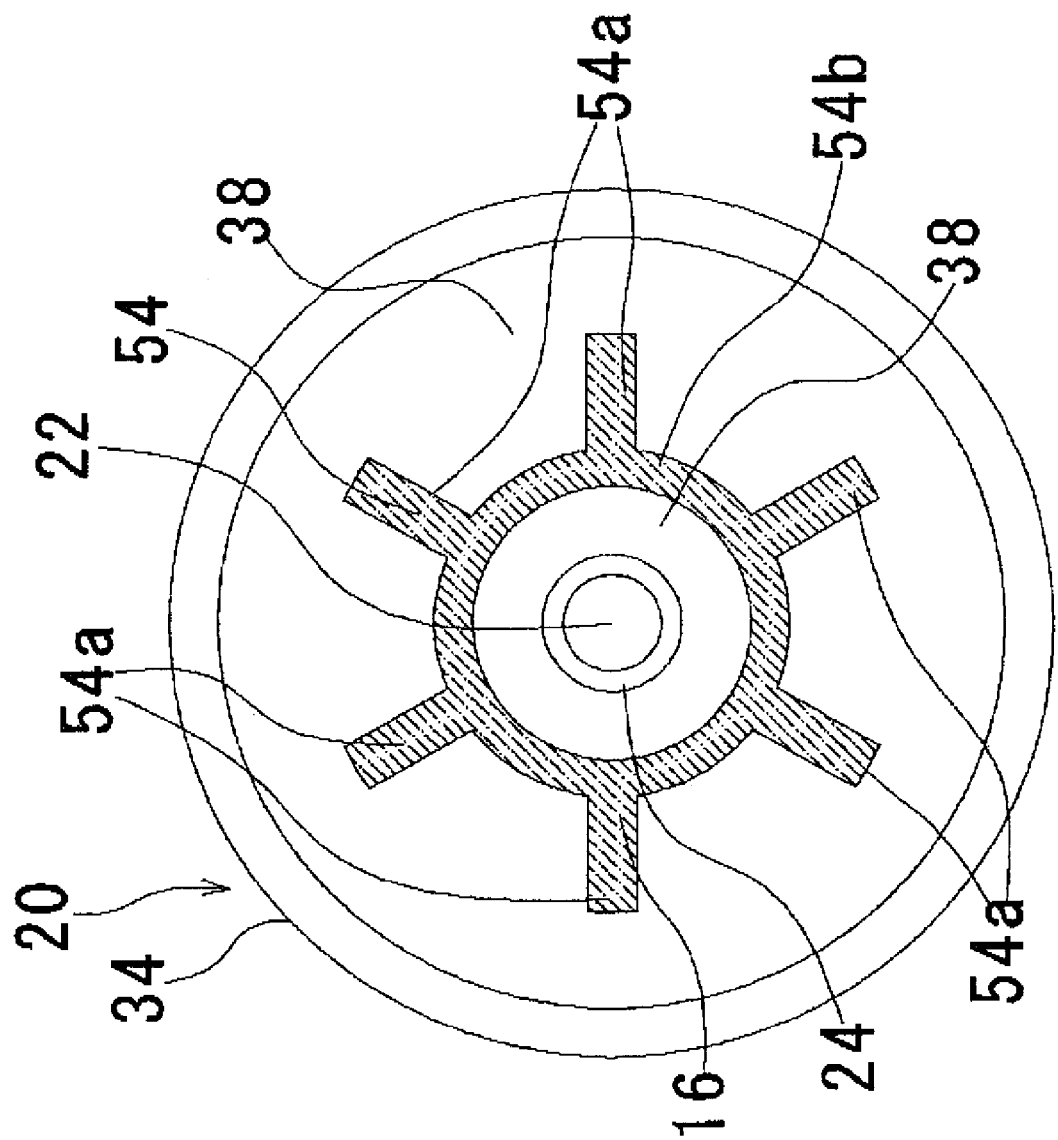
FIG. 4 is a plan view of a lower surface of an exemplary turntable according to the present invention.

FIG. 4 is a plan view of the lower surface of the turntable in this preferred embodiment.

Referring to FIG. 4, an adhesive receiving portion 54 is provided on the axially lower surface of the turntable 20 and is concave upward in the axial direction. The adhesive receiving portion 54 includes a plurality of grooves 54a and an annular groove 54b connecting the grooves 54a to one other. The grooves 54b are formed to extend from the annular groove 54a radially outwardly. The adhesive 16 is also placed in the adhesive receiving portion 54, and then spreads between the turntable 20 and the rotor holder 60 through the adhesive receiving portion 54. Thus, an area at which the turntable 20 and the rotor holder 60 are bonded to each other can be increased by the area of adhesive receiving portion 54, as compared with a case where no adhesive receiving portion 54 is provided. Therefore, the strength of securing the turntable 20 and the rotor holder 60 to each other can be increased.

In this preferred embodiment, the adhesive receiving portion 54 is not in communication with the outer recess 70. However, they may be in communication with each other. In this case, it is only necessary that adhesive 16 is placed in the space for adhesive 18. That is, the step for applying the adhesive 16 can be simplified.

An example of the adhesive 16 is thermosetting epoxy resin. It is desirable that the adhesive 16 be elastic adhesive which has strong resistance against shear stress when solidified.

In this preferred embodiment, the outer recess 70 is formed between the upper peripheral portion of the fitting bore 78 and the lower peripheral portion of the securing bore 22. However, the position of the outer recess 70 is not limited thereto. It is enough that the outer recess 70 exists between the upper peripheral surface of the fitting bore 78 and the lower peripheral surface of the securing bore 22.

Figure 5:
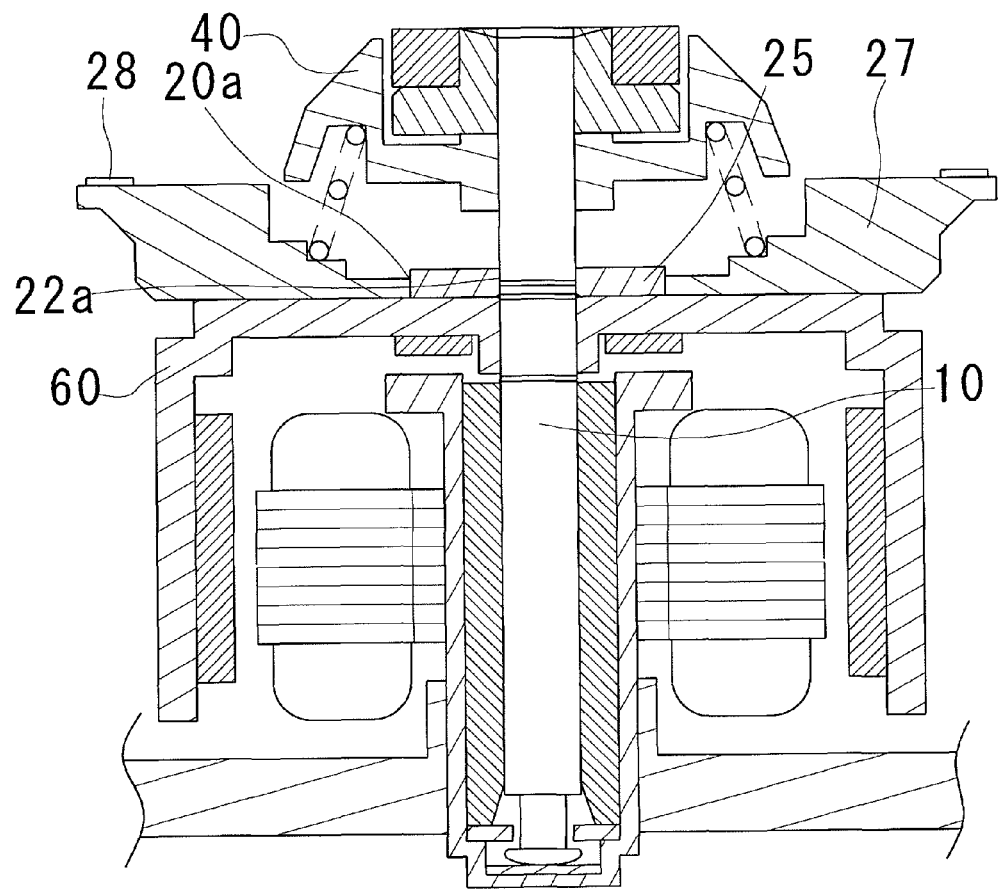
FIG. 5 is a cross-sectional view of a motor according to a second preferred embodiment of the present invention.

FIG. 5 is a cross-sectional view of a motor 1a according to a second preferred embodiment of the present invention. This preferred embodiment is different from the first preferred embodiment in that a turntable 20a includes an inner turntable portion 25 and an outer turntable portion 27. Except for this point, the motor 1a of this preferred embodiment is approximately the same as the motor 1 of the first preferred embodiment. Thus, the detailed description of the motor 1a is omitted. In the following description, the difference between the motor 1a of this preferred embodiment and the motor 1 of the first preferred embodiment is mainly described.

In the turntable 20a, the inner turntable portion 25 is made of metal, e.g., brass, and has a securing bore 22a which is similar to the securing bore 22 in the first preferred embodiment. The outer turntable portion 27 is made of resin and has a placement portion 28a which is similar to the placement portion 28 in the first preferred embodiment. Thus, the inner turntable portion 25 has higher strength and can be press-fitted to the outer surface of the shaft 10 with a stronger force, as compared with the turntable 20 of the first embodiment. Therefore, it is possible to secure the shaft 10 and the turntable 20 to each other with higher securing strength.

Figure 6A:
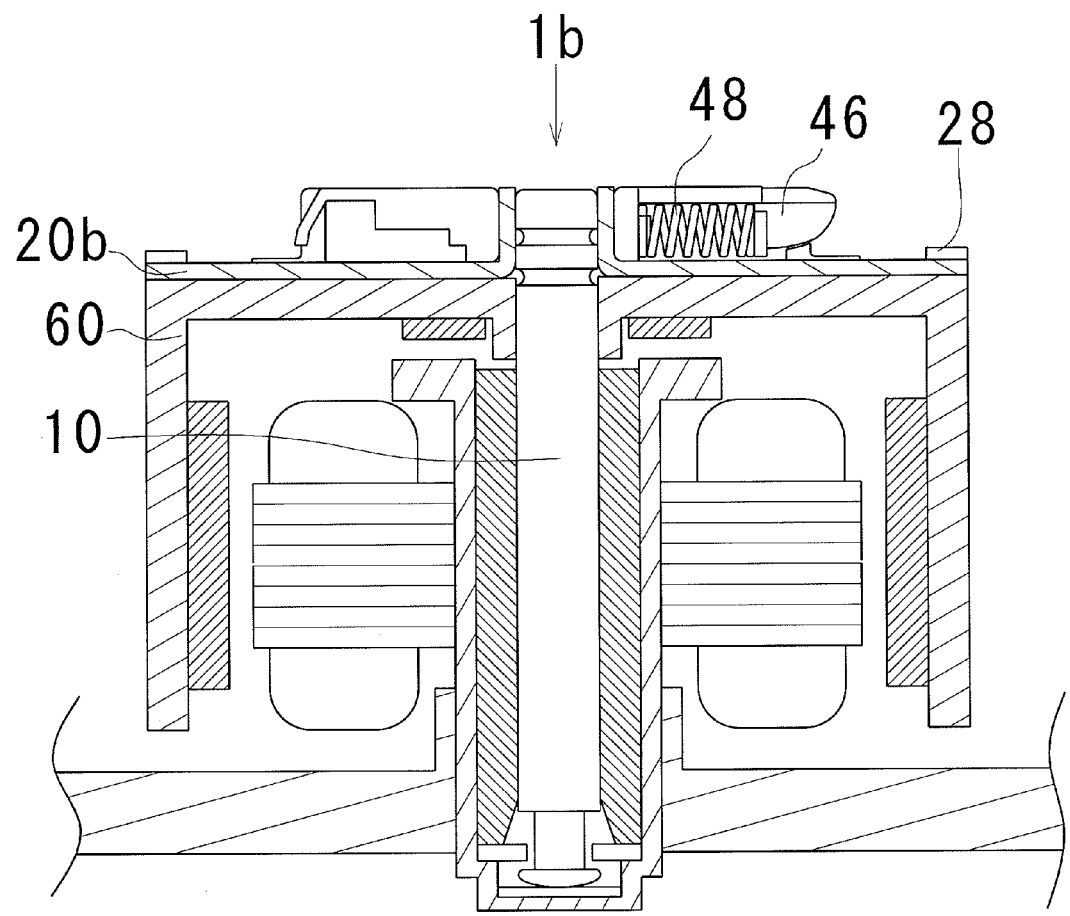
FIG. 6 is a cross-sectional view of a motor according to a third preferred embodiment of the present invention.
Figure 6B:
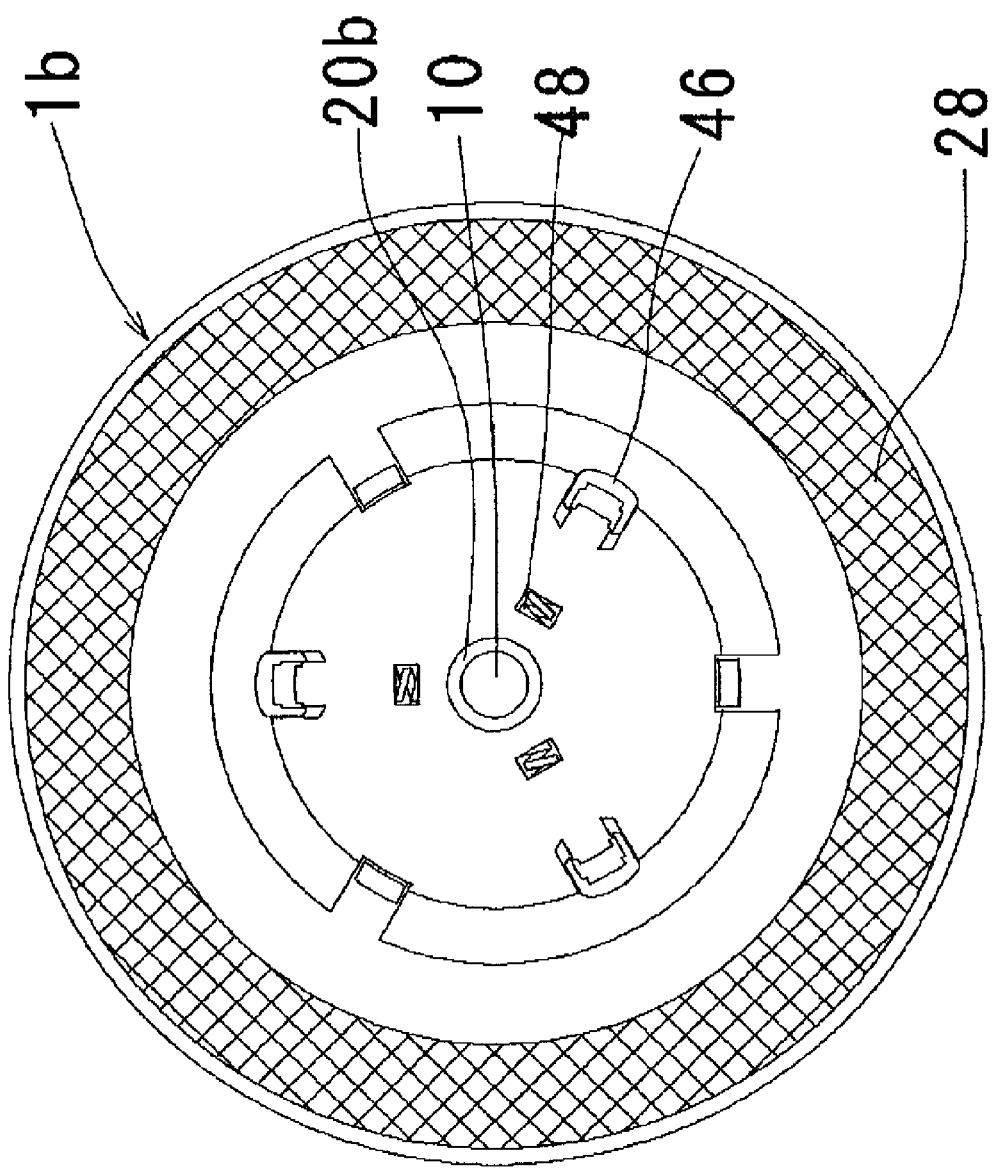

FIG. 6A is a cross-sectional view of a motor 1b according to a third preferred embodiment of the present invention. FIG. 6B shows a chucking arrangement in this preferred embodiment.

In this preferred embodiment, the securing structure described in the first preferred embodiment is applied to a self-chucking type turntable 20b. Except for this point, the motor 1b is substantially the same as the motor 1 of the first preferred embodiment. Thus, the detailed description of the motor 1b is omitted here. In the following description, the difference between the motor 1b and the motor 1 of the first preferred embodiment is mainly described.

Referring to FIG. 6A, an optical disc is held by a chucking claw 46 in the motor 1b. The chucking arrangement in this preferred embodiment includes a plurality of chucking claws 46 radially disposed, as shown in FIG. 6B, and springs 48 each forcing an associated one of the chucking claws 46 outwardly in the radial direction. The chucking claws 46 and the springs 48 are provided on the axially upper surface of the turntable 20b.

When a user mounts an optical disc, the user places the optical disc above the chucking claws 46 and presses it axially downward. The upper surface of each chucking claw 46 is inclined such that an axial height decreasing outwardly in the radial direction. Thus, the optical disc pressed down by the user presses the inclined upper surface of each chucking claw 46 and moves the chucking claw 46 inwardly in the radial direction. When the user further press the optical disc, the optical disc comes into contact with the placement portion 28b. Then, the chucking claws 46 are moved again outwardly in the radial direction by the force applied by the springs 48. The lower surface of each chucking claw 46 is also inclined and presses the optical disc by the force applied by the spring 48. In this manner, the optical disc is placed and held on the placement portion 28b.

When the motor 1b of this preferred embodiment is used, the user by itself presses the optical disc directly and secures it on the placement portion 28b, as described above. Thus, it is likely that forces are applied to the motor 1b from various directions. A strong force may be applied. However, the securing structure employed in this preferred embodiment provides a strong securing force, as described in the first preferred embodiment. Thus, even in the motor 1*b* employing a self-chucking type turntable, high separation strength of the shaft is achieved.

Figure 7:
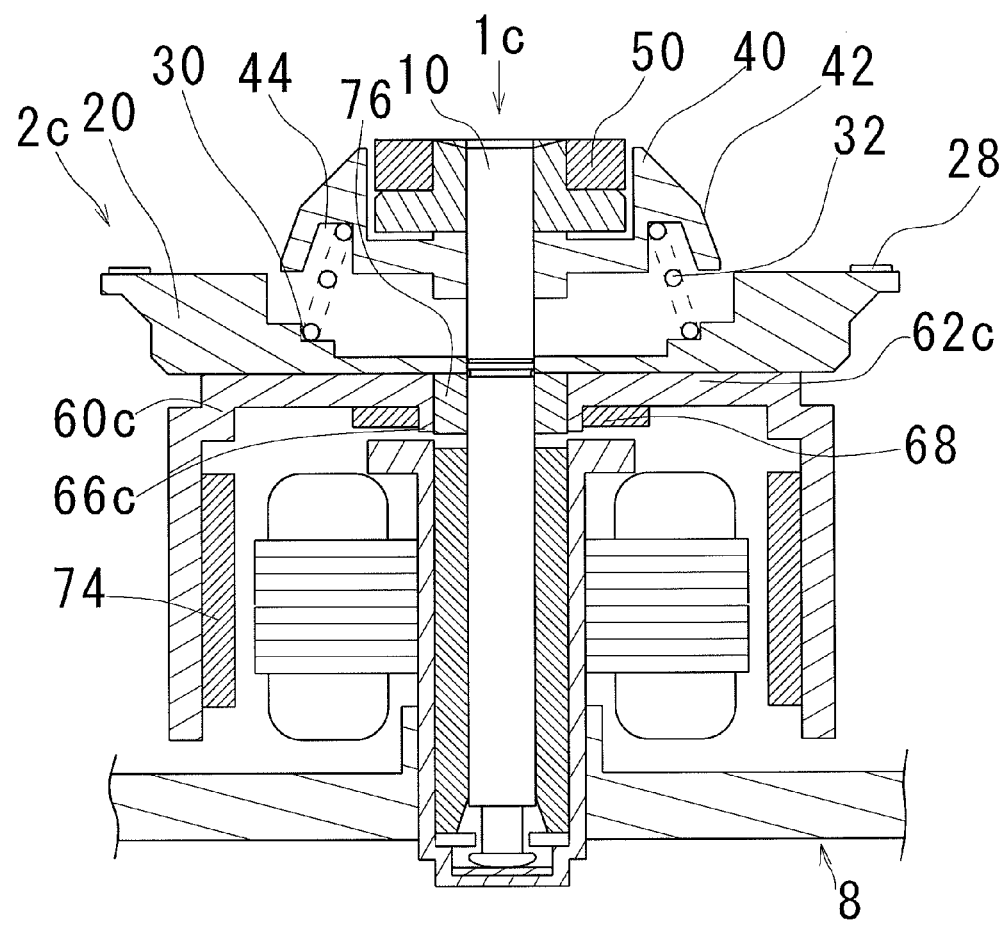
FIG. 7 is a cross-sectional view of a motor according to a fourth preferred embodiment of the present invention.

FIG. 7 shows a motor 1*c* according to a fourth preferred embodiment of the present invention. In this preferred embodiment, a manner of securing the rotor holder 60*c* to the shaft 10 is different from that in the first preferred embodiment. Except for this point, the motor 1*c* of this preferred embodiment is substantially the same as the motor 1 of the first preferred embodiment. Therefore, the detailed description of the motor 1*c* is omitted. In the following description, the difference between the preferred embodiment and the first preferred embodiment is mainly described.

In this preferred embodiment, the extending portion 66*c* of the lid 62*c* of the rotor holder 60*c* is not secured directly to the shaft 10. Instead, the outer surface of an approximately ring-shaped bushing 76 is fitted and secured to the inner surface of the extending portion 66*c*. The bushing 76 and the shaft 10 are press-fitted to each other such that the inner surface of the busing 76 and the outer surface of the shaft 10 are in contact with each other. The inner surface of the busing 76 and the outer surface of the shaft 10 are bonded to each other. In this manner, the rotor holder 60 and the shaft 10 are secured to each other.

As shown in FIG. 7, the bushing 76 is disposed between the shaft 10 and the rotor holder 60*c* in this preferred embodiment. Thus, even if the bushing 76 and the shaft 10 are press-fitted to each other with a relatively strong force, plastic deformation of the rotor holder 60*c* does not occur. Moreover, the rotor holder 60*c* is hollow and approximately cylindrical and the bushing 76 is approximately ring-shaped. Thus, when the bushing 76 and the shaft 10 are press-fitted to each other, it is possible to easily obtain high coaxiality between the shaft 10 and the rotor holder 60*c*.

Figure 8:
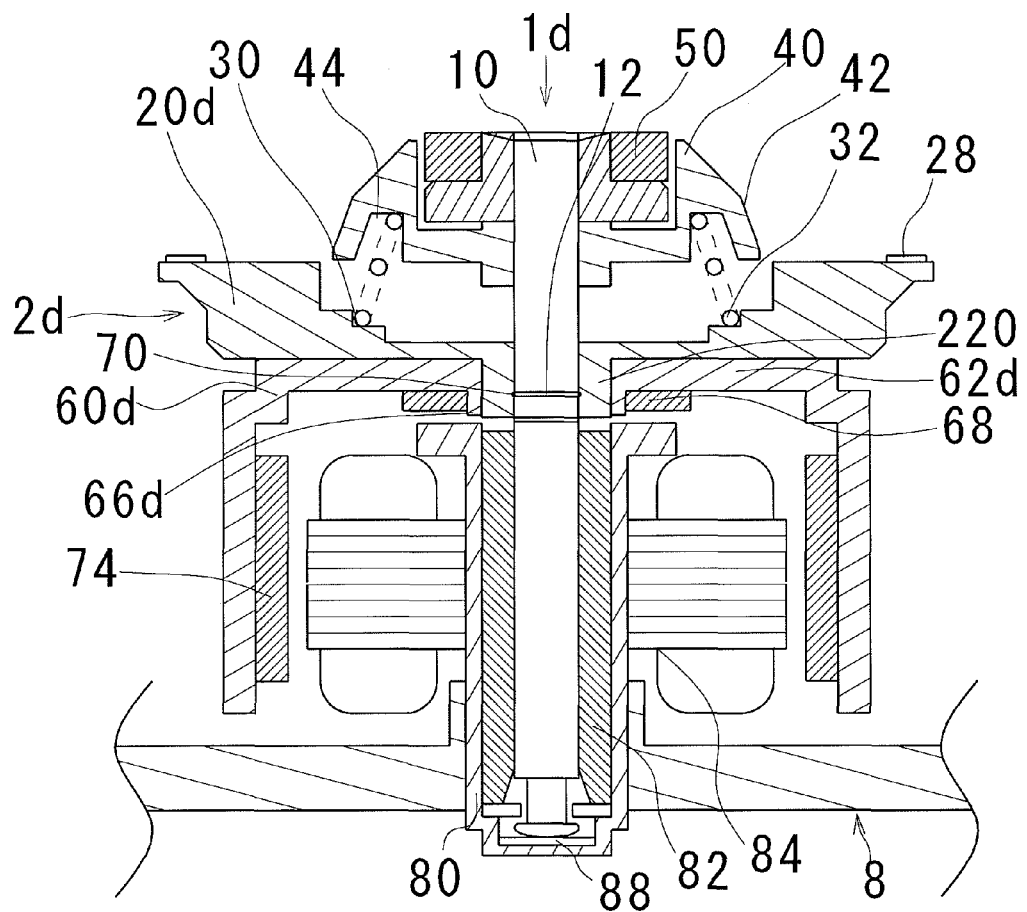
FIG. 8 is a cross-sectional view of a motor according to a fifth preferred embodiment of the present invention.

FIG. 8 shows a motor 1*d* according to a fifth preferred embodiment of the present invention. In this preferred embodiment, a turntable 20*d* is provided with a hollow, approximately cylindrical portion 220 (hereinafter, simply referred to as a cylindrical portion 220) at its center, which projects axially downward, as shown in FIG. 8. The cylindrical portion 220 is coaxial with the center axis and defines a securing bore 22*d* therein. Into the securing bore 22*d* is inserted the shaft 10. The outer surface of the shaft 10 is secured to the inner surface of the cylindrical portion 220. Since the cylindrical portion 220 projects axially downward, the securing bore 22*d* into which the shaft 10 is inserted is longer than the securing bore 22 of the turntable 20 described in the first preferred embodiment. That is, the area where the turntable 20*d* is in contact with and secured to the shaft 10 is larger in this preferred embodiment than that in the first preferred embodiment.

The outer recess 70 is formed by cutting a portion of the fitting surface 23 of the turntable 20*d*, and faces the inner recess 12 formed on the outer surface of the shaft 10 in the radial direction.

Moreover, the rotor holder 60 is not secured directly to the shaft 10. As shown in FIG. 8, the inner surface of the extending portion 66 of the rotor holder 60 is secured to the outer surface of the cylindrical portion 220 of the turntable 20*d* attached to the shaft 10. That is, the rotor holder 60 is secured to the shaft 10 via the turntable 20*d*.

In this preferred embodiment, the turntable 20*d* is directly connected to the shaft 10, but the rotor holder 60 is not. Therefore, precision of securing the shaft 10 and the turntable 20*d* to each other can be easily controlled.

Except for the above, the motor 1*d* of this preferred embodiment is substantially the same as the motor of the first preferred embodiment. Therefore, the detailed description of the motor 1*d* is omitted here. In this preferred embodiment, the same effects as those obtained in the first preferred embodiment can be obtained.

Next, a test for separation strength carried out for measuring a force securing the turntable 20 and the shaft 10 to each other is described.

Figure 9:
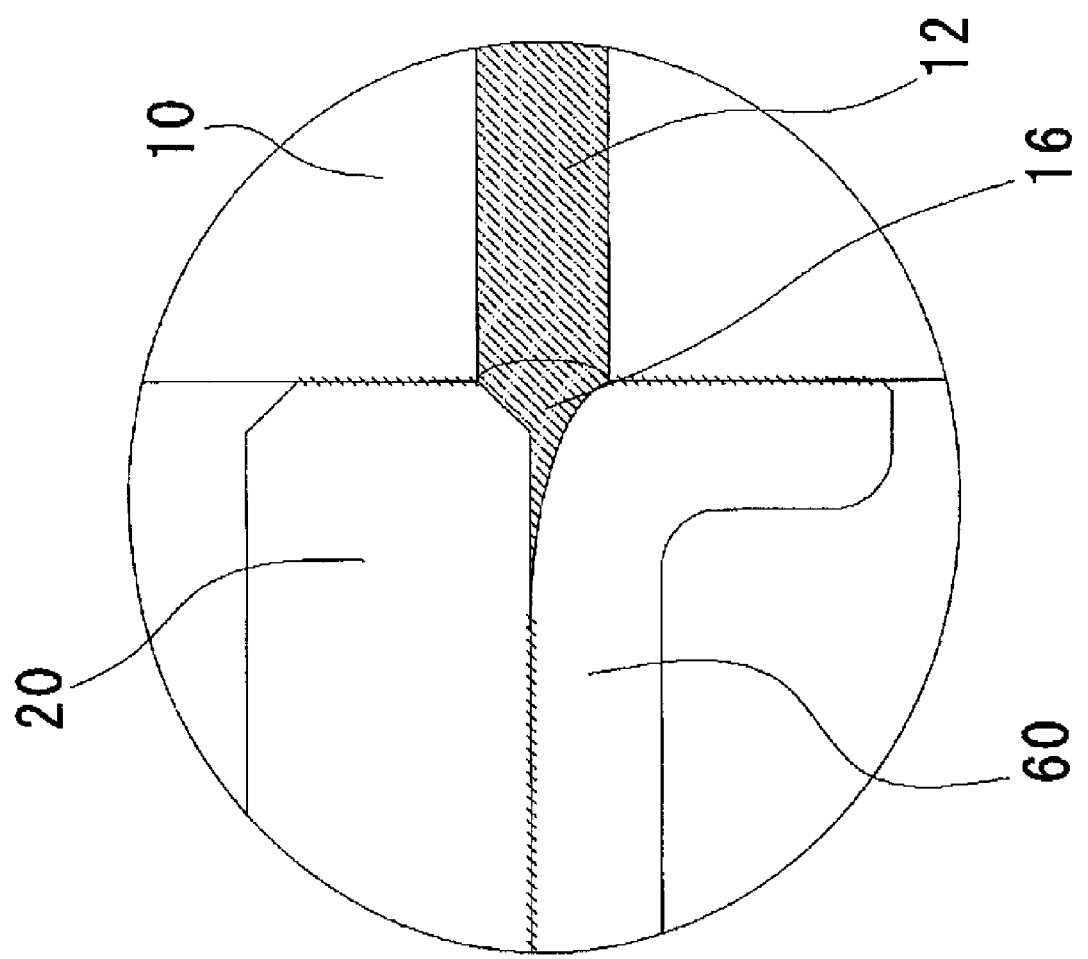
FIG. 9 is an enlarged view of an exemplary securing structure according to the present invention, which is used in a test for separation strength.
Figure 10:
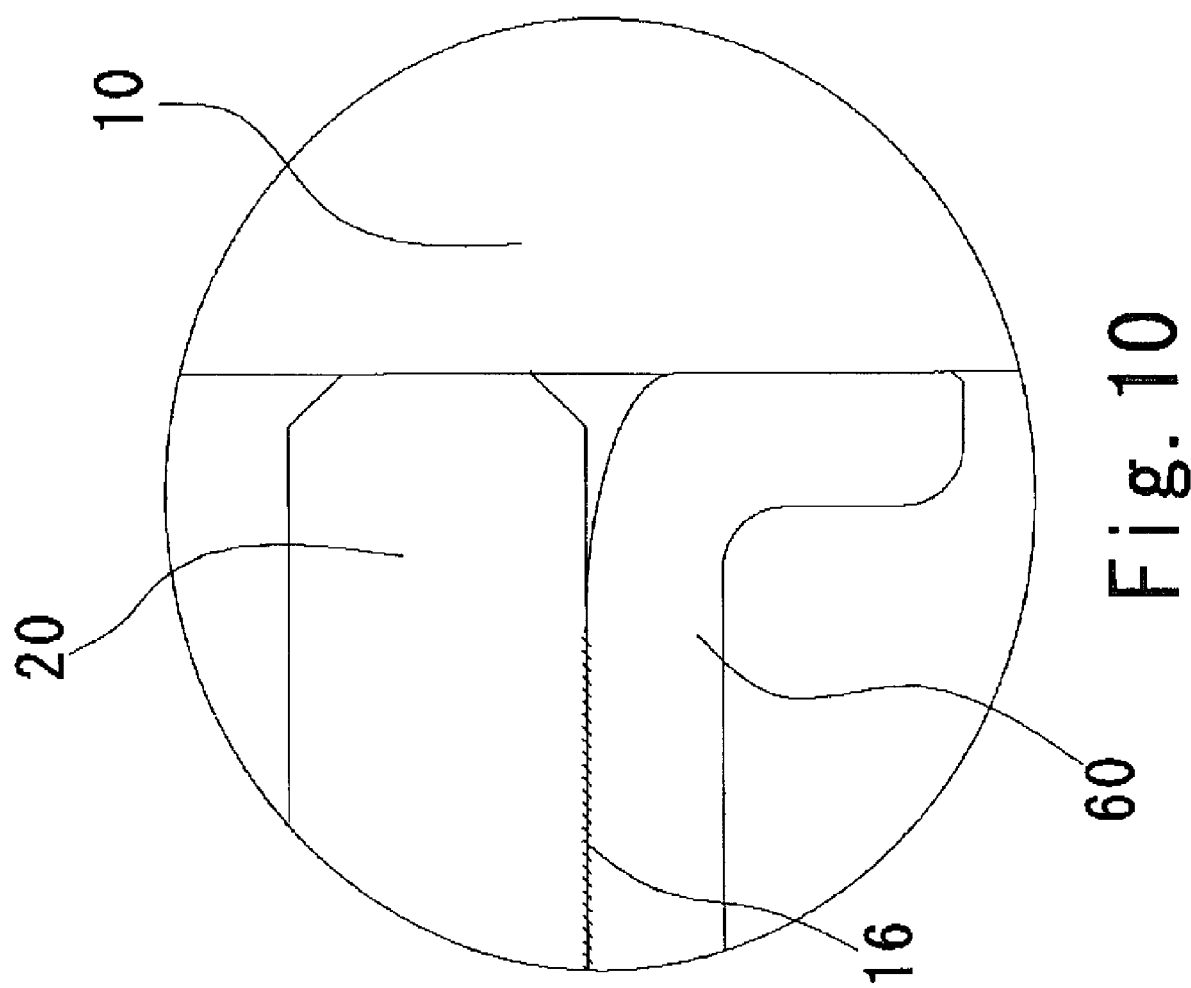
FIG. 10 is an enlarged view of a comparative securing structure used for comparison in the test for separation strength.
Figure 11:
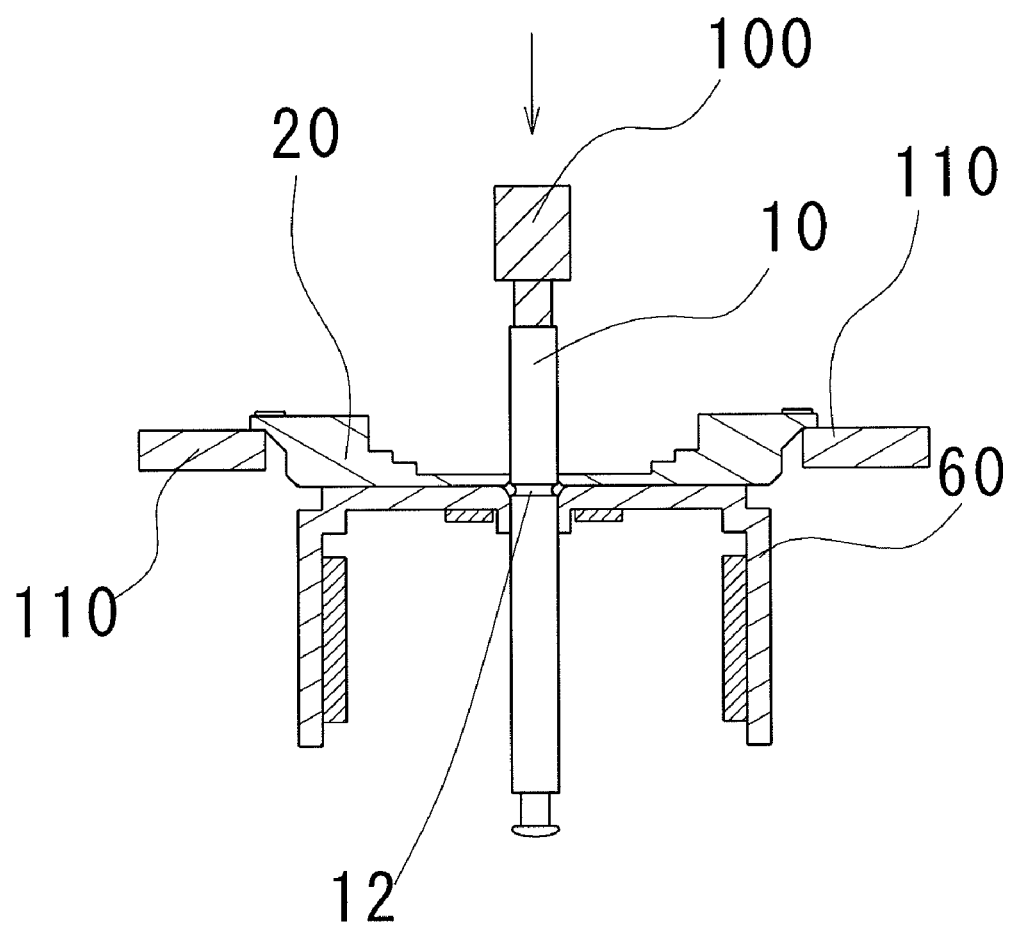
FIG. 11 illustrates how to carry out the test for separation strength.
Figure 12:
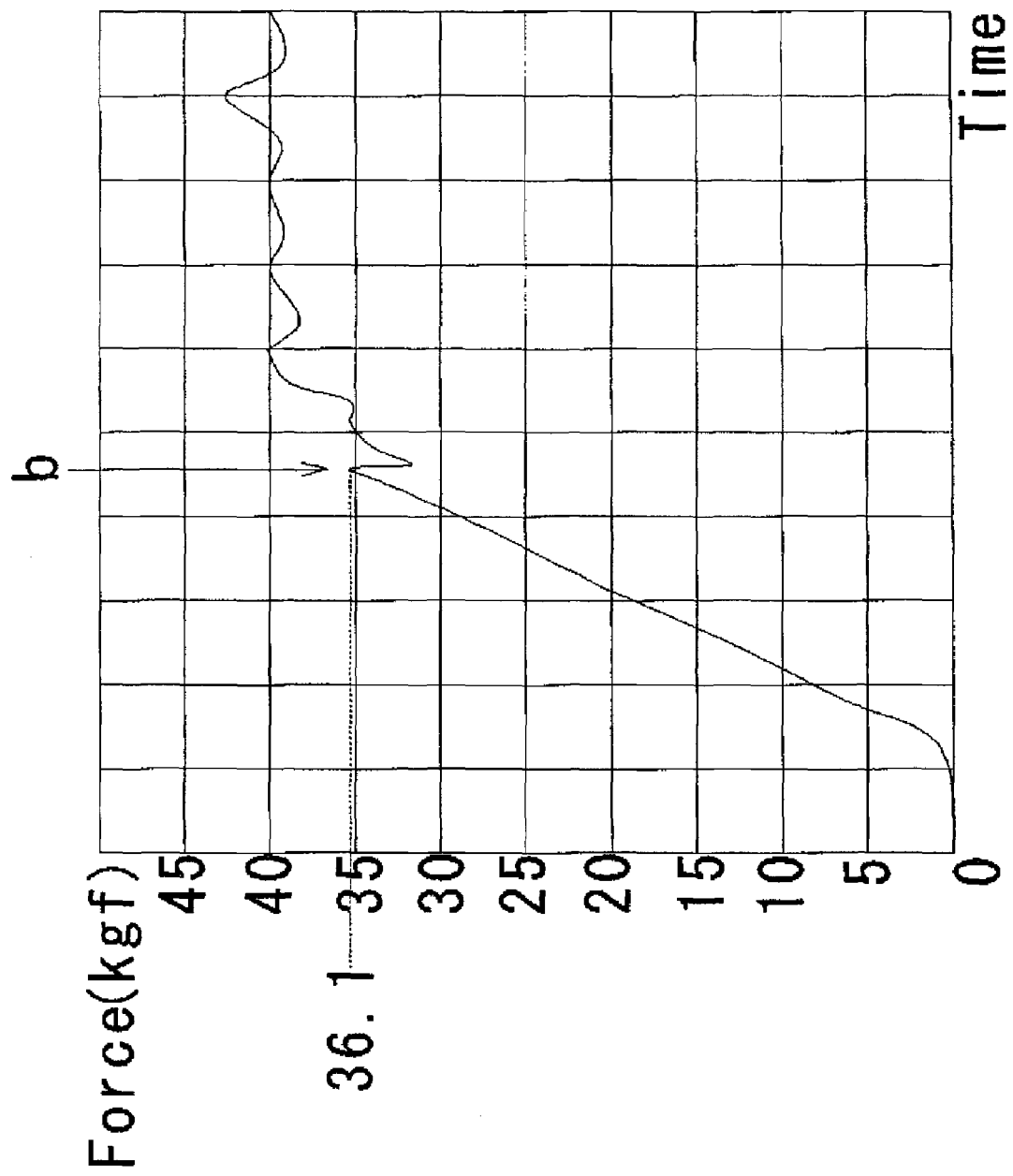
FIG. 12 shows a result of the test carried out for the comparative securing structure of FIG. 10.
Figure 13:
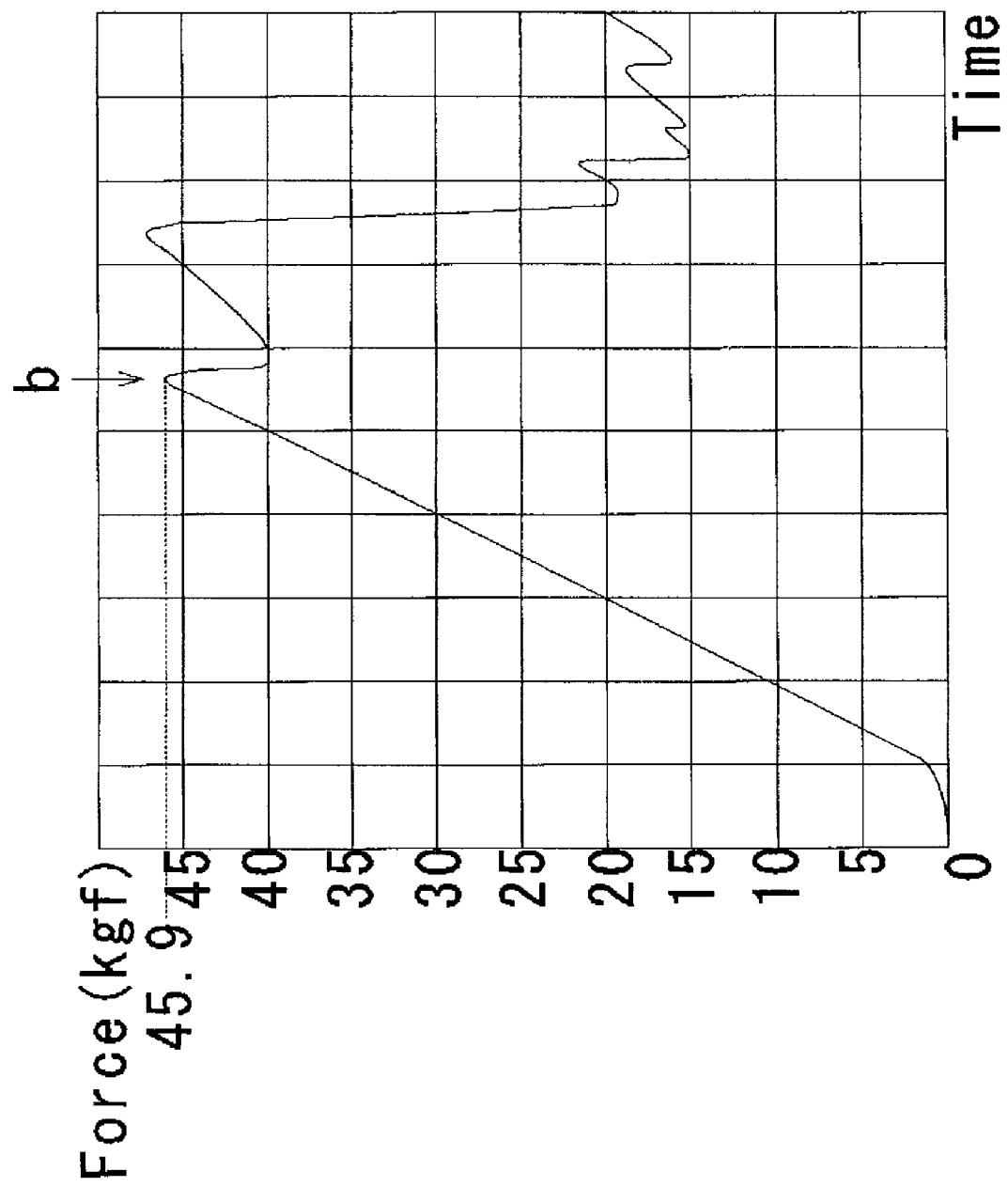
FIG. 13 shows a result of the test carried out for the exemplary securing structure of FIG. 9.

FIG. 9 shows a securing structure in a rotating assembly according to a preferred embodiment of the present invention used in the test for separation strength. FIG. 10 is a cross-sectional view of a securing structure of a comparative rotating assembly, which was used for comparison. FIG. 11 illustrates how to carry out the test. FIGS. 12 and 13 show test results.

For comparison, the rotating assembly of FIG. 10 (hereinafter, the comparative rotating assembly) was used. In the comparative rotating assembly, neither inner recess 12 nor auxiliary groove 14 is formed on the outer surface of the shaft 10. Adhesive is applied only between the turntable 20 and the rotor holder 60, but is not applied in the outer recess 70, between the turntable 20 and the shaft 10, and the rotor holder 60 and the shaft 10. Thus, the turntable 20 and the rotor holder 60 are secured to the shaft 10 by press fitting only.

FIG. 11 shows tools used in the test for separation strength. A pressing jig 100 can be moved in the axial direction. A receiving jig 110 is disposed axially below the pressing jig 100 to be axially opposed thereto. The receiving jig 110 is fixed to a test table (not shown) so as not to move.

The test was carried out in the following manner. Referring to FIG. 11, the outer peripheral portion 34 of the turntable 20 was fixed to the receiving jig 110 with its lower surface in contact with the receiving jig 110. Then, the pressing jig 100 was moved in a direction shown with arrow 105 in FIG. 11, i.e., axially downward. When the pressing jig 100 moved axially downward, its lower end came into contact with the upper end of the shaft 10. When the pressing jig 100 further moved down, the shaft 10 was pressed axially downward. The axially downward pressing force applied to the shaft 10 caused shear stress between the shaft 10 and the turntable 20 and between the shaft 10 and the rotor holder 60, because the turntable 20 was supported by the receiving jig 110.

In the test for separation strength, the pressing force applied by the pressing jig 100 was increased with time. As the pressing force increased, the shaft 10 and the turntable 20 and the rotor holder 60 both secured to the shaft 10 could not bear shear stress at a certain time. At this time, the shaft 10 was axially shifted relatively to the turntable 20 and the rotor holder 60. In the test, the magnitude of the pressing force applied by the pressing jig 100 at the time of occurrence of the shift of the shaft 10 was measured.

FIGS. 12 and 13 show test results. In both graphs of FIGS. 12 and 13, the vertical axis represents the pressing force (kgf) applied by the pressing jig 100 and the horizontal axis represents time.

In both the graphs, curves continue to rise until yield point b, and thereafter fall. This shows that at yield point b the shaft 10 started to be shifted relative to the turntable 20 because shear stress acting between the shaft 10 and the turntable 20 and between the shaft 10 and the rotor holder 60 exceeded the securing force acting between the shaft 10 and the turntable 20. At and after yield point b, the adhesive 16 placed and solidified between the shaft 10 and the turntable 20 and between the shaft 10 and the rotor holder 60 was sheared or separated from the shaft 10 or the turntable 20, and the shaft 10 or the rotor holder 60. Thus, the securing structure between the shaft 10 and the turntable 20 formed by the adhesive 16 was irreversibly broken down. This breaking is called as yield. When yield occurred, the securing force between the shaft 10 and the turntable 20 was largely reduced. Thus, the pressing force applied by the pressing jig 100 to the shaft 10 at yield point b was regarded as the separation strength (securing force acting between the shaft 10 and the turntable 20) in the rotating assembly under test.

FIG. 12 shows the separation strength was 36.1 kgf in the comparative rotating assembly. FIG. 13 shows the separation strength was 45.9 kgf in the rotating assembly of the present invention. Thus, the securing structure of the present invention increased the separation strength by 9.8 kgf.

The test for separation strength was also carried out for the securing structure according to a preferred embodiment of the present invention, in which in addition to the inner recess 12 the auxiliary groove 14 was provided on the outer surface of the shaft 10 in a portion fitted to the inner surface of the turntable 20 defining the securing bore 22 in a similar manner. The test result shows that this securing structure increased the separation strength by about 10 kgf from the separation strength provided by the securing structure shown in FIG. 9, i.e., only the inner recess 12 was provided.

Next, a manufacturing method of the motor 1 according to a preferred embodiment of the present invention is described referring to FIGS. 14 to 18.

Figure 14:
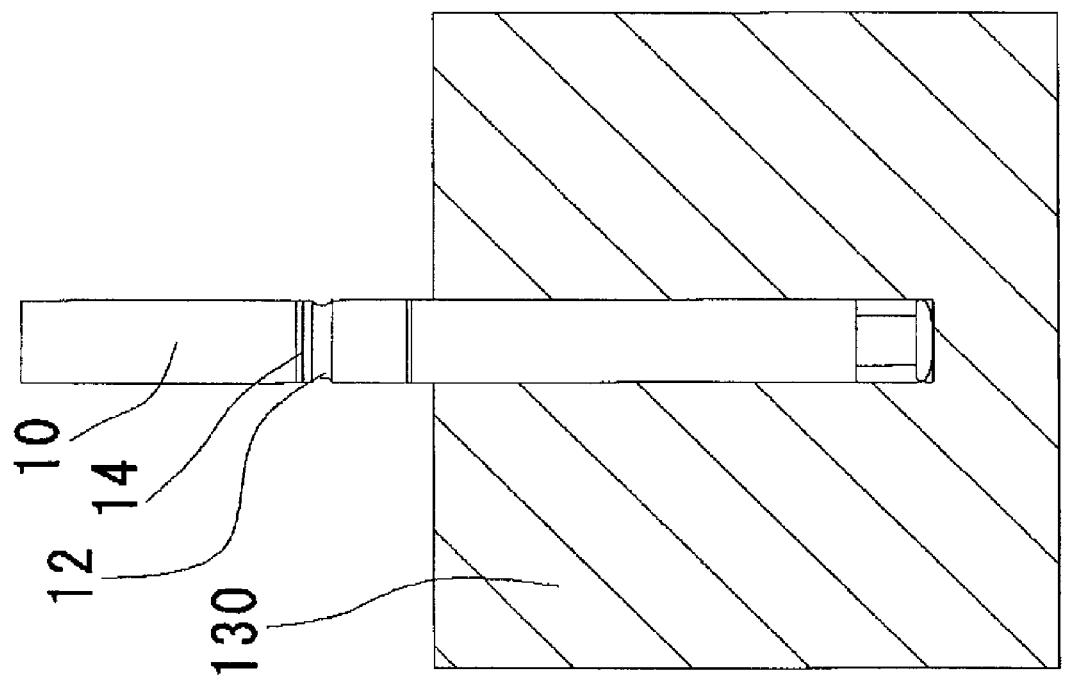
FIG. 14 shows a state in which a first preparation step of an exemplary manufacturing method according to the present invention has been finished.
Figure 15:
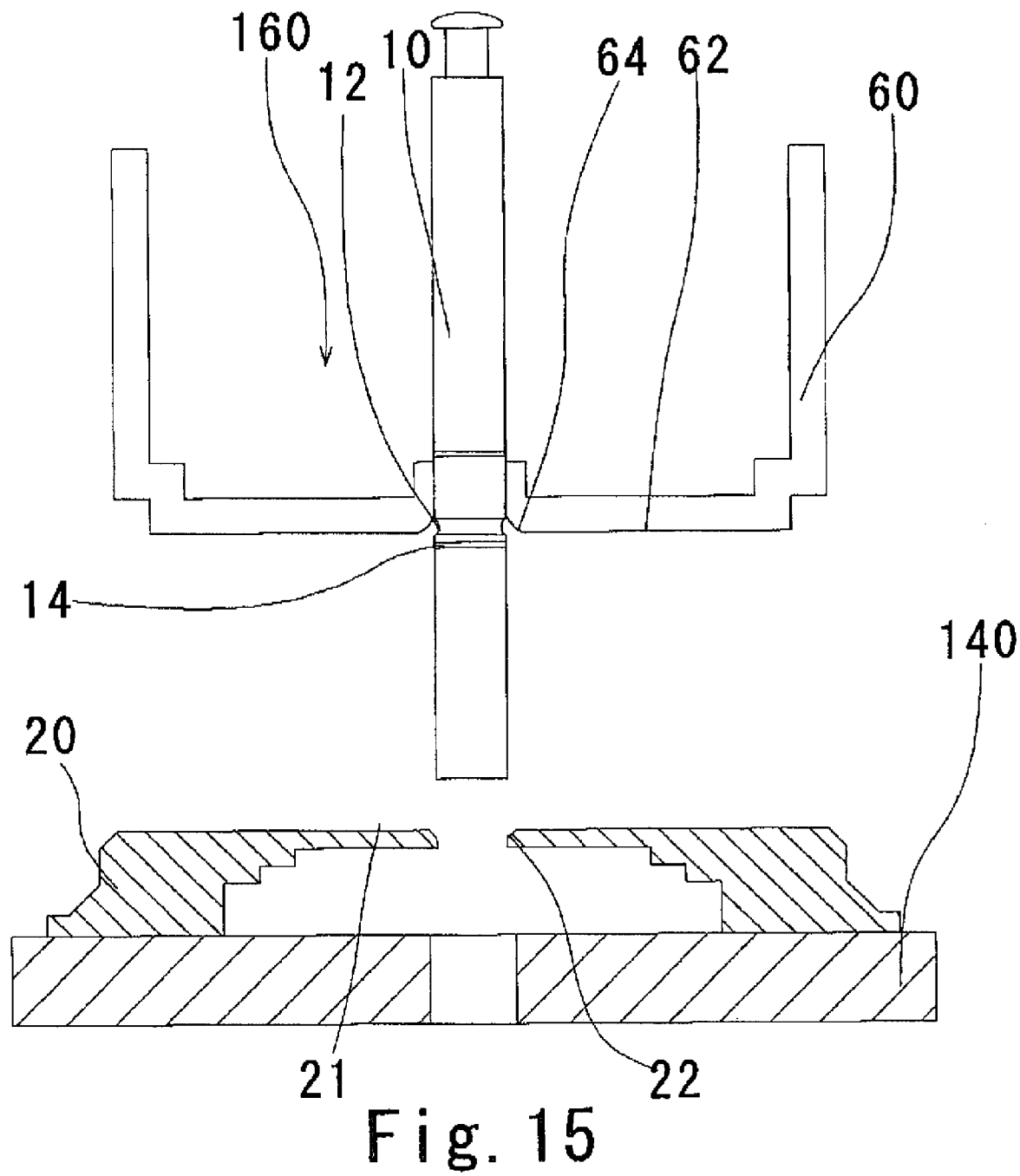
FIG. 15 shows a state in which a second preparation step of the exemplary manufacturing method has been finished.
Figure 16:
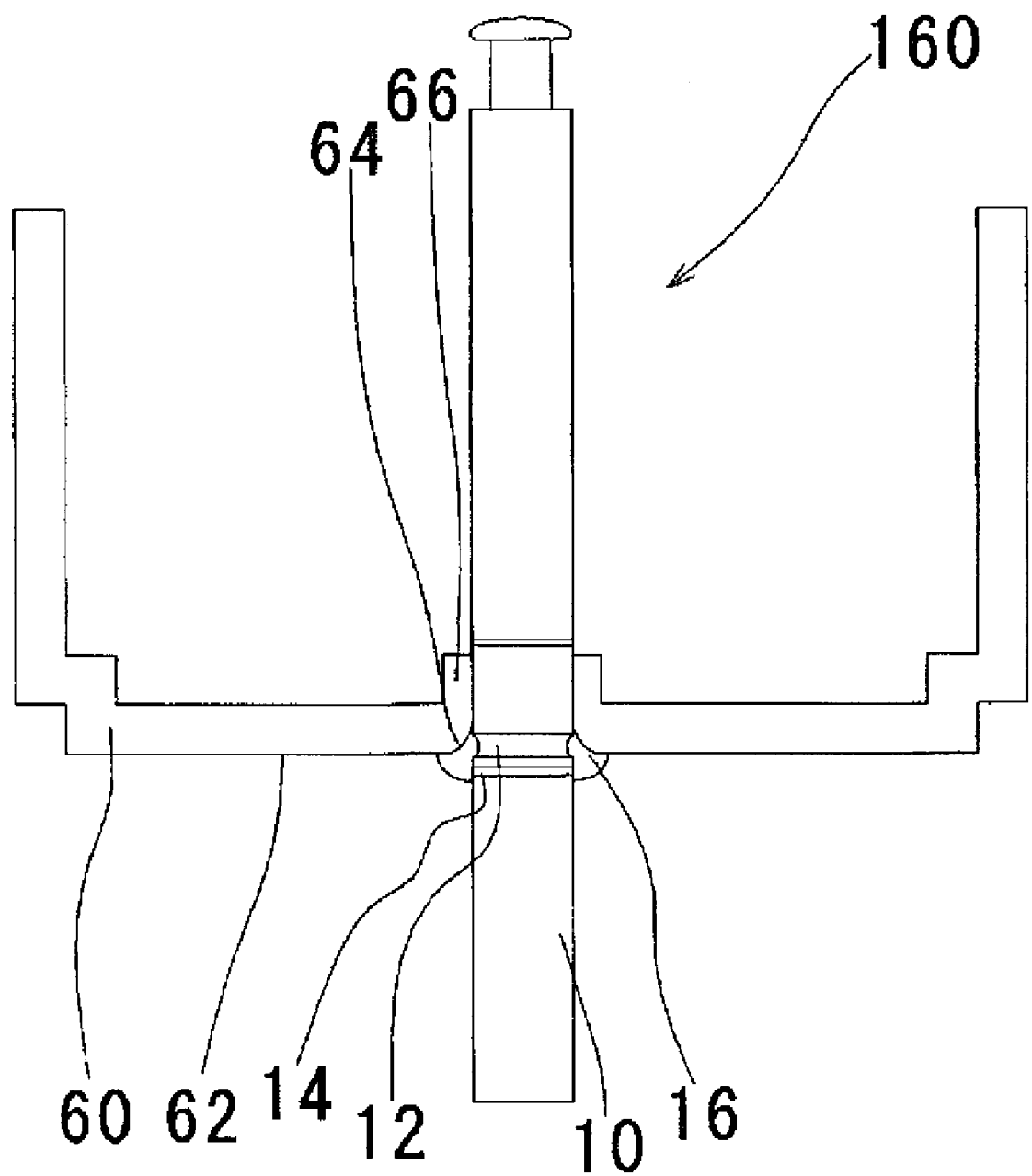
FIG. 16 shows a state in which an adhesive application step of the exemplary manufacturing method has been finished.
Figure 17:
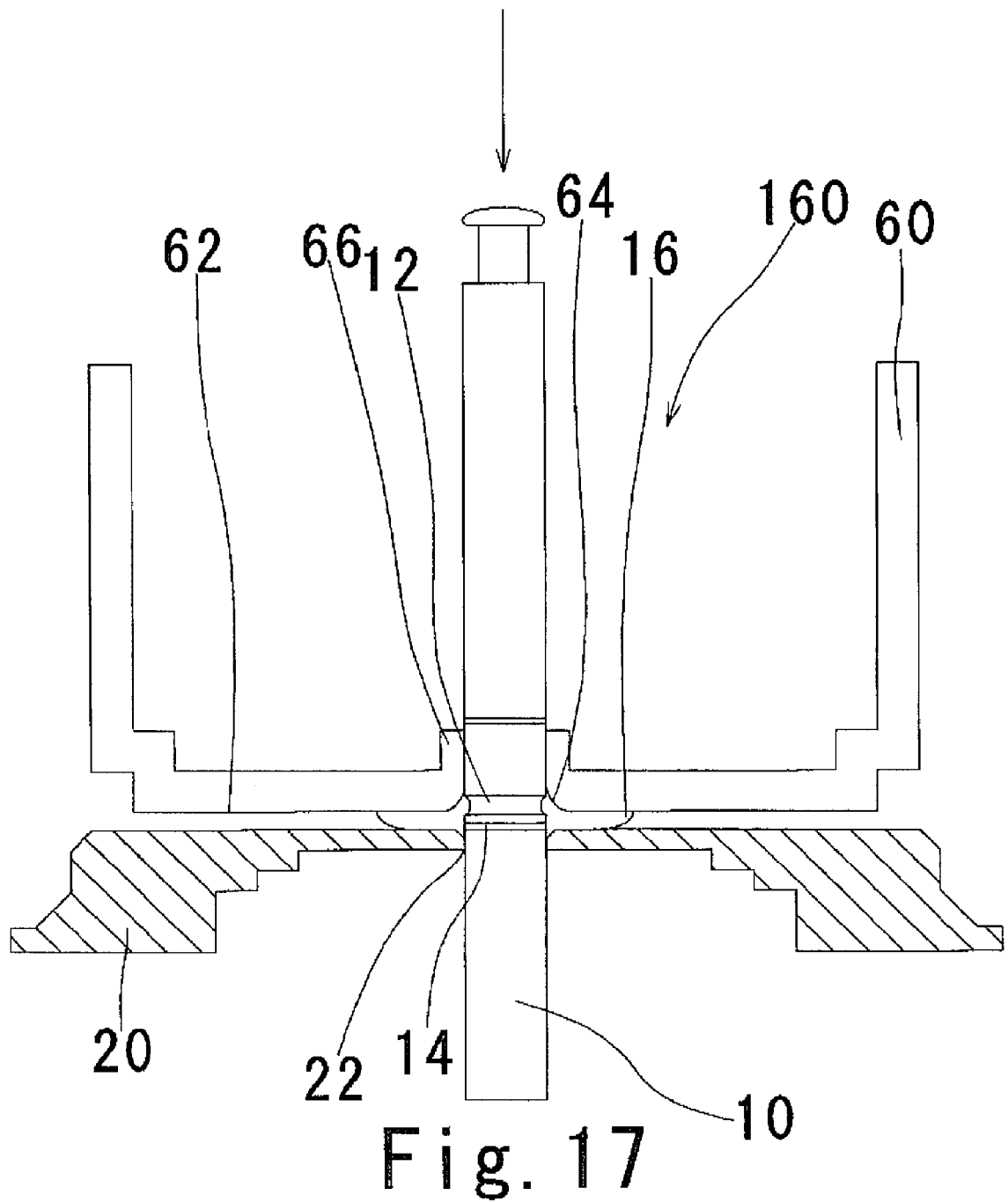
FIG. 17 shows a state in the middle of a second press-fitting step of the exemplary manufacturing method.
Figure 18:
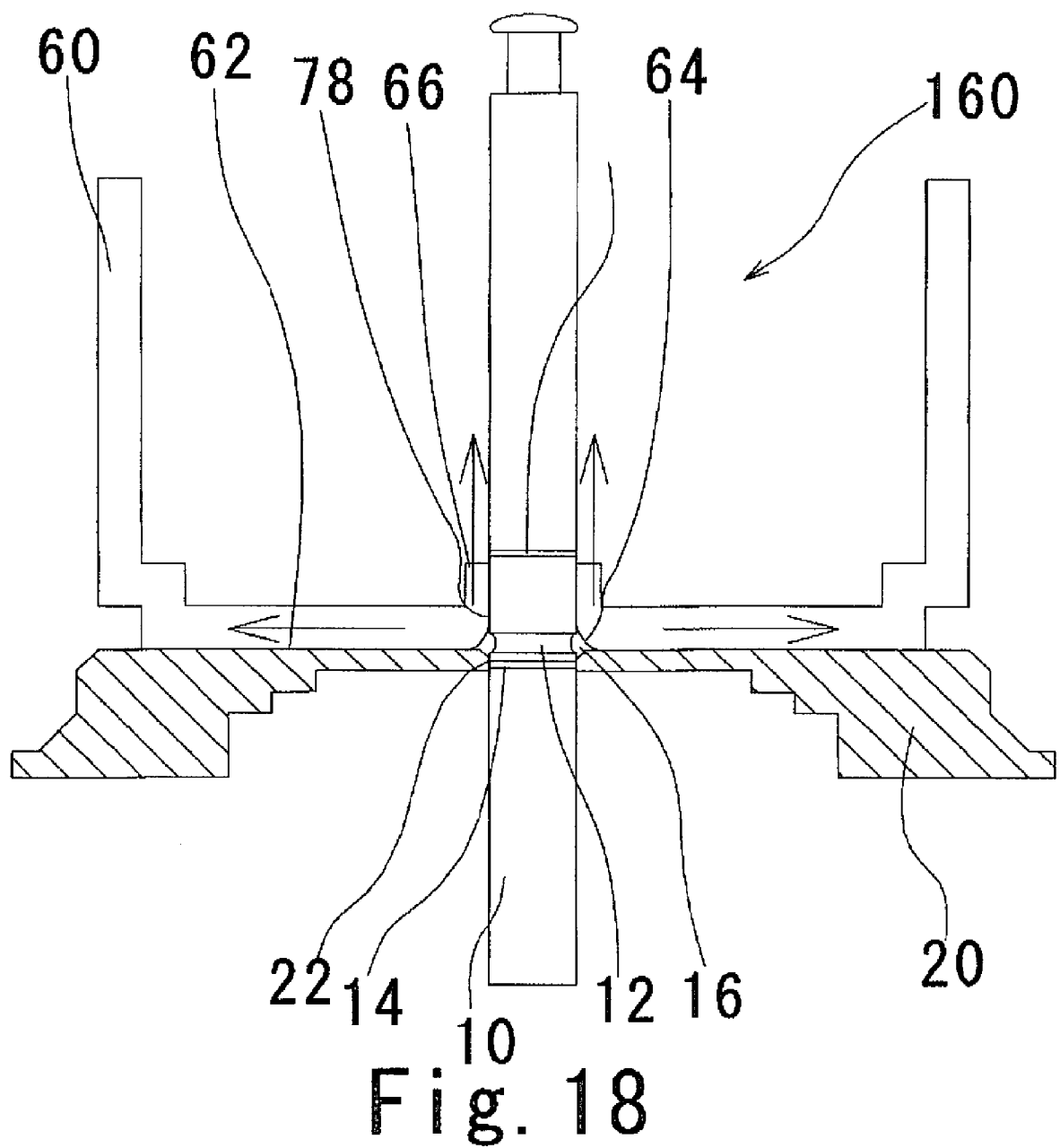
FIG. 18 shows a state in which the second press-fitting step of the exemplary manufacturing method has been finished.
Figure 19:
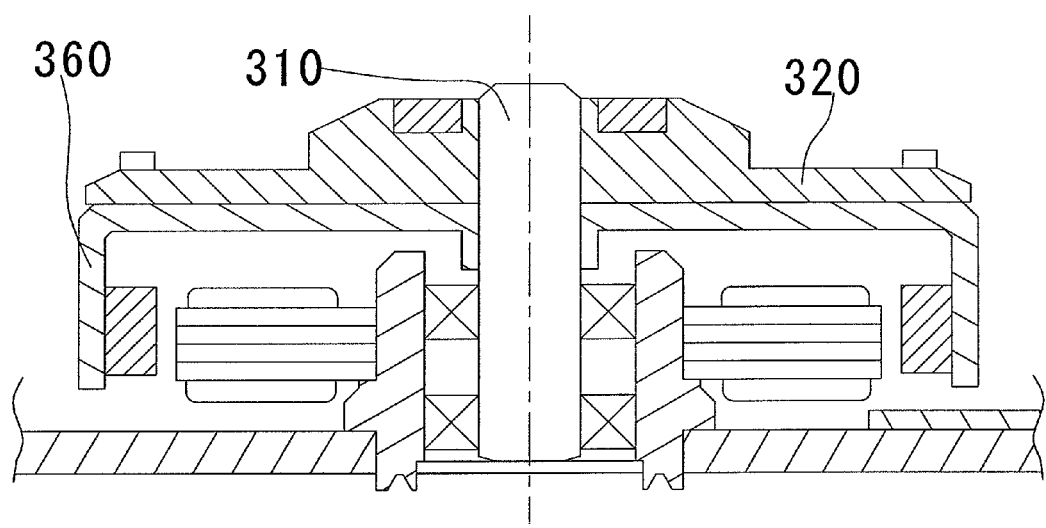
FIG. 19 shows an exemplary conventional motor.

FIG. 14 shows a state in which a first preparation step of the manufacturing method of the rotating assembly 2 has been finished. FIG. 15 shows a state in which a second preparation step has been finished. FIG. 16 shows a state in which an adhesive application step has been finished. FIG. 17 shows a state in the middle of a second press-fitting step. FIG. 18 shows a state in which the second press-fitting step has been finished.

The rotating assembly 2 is assembled by carrying out the first preparation step of securing the shaft 10 to a jig, a first press-fitting step of press-fitting the rotor holder 60 and the shaft 10 to each other, the second preparation step of securing the turntable 20 to a jig, the adhesive application step of applying adhesive 16 on the shaft 10 and the rotor holder 60, the second press-fitting step of press-fitting the shaft 10 and the rotor holder 60 to the turntable 20, and a post-process step of attaching the preload magnet 68, the cone member 40, and the chucking yoke 52 to the rotor holder 60 and the shaft 10.

Referring to FIG. 14, the shaft 10 is fixed to a shaft fixing jig 130 having a concave portion in the first preparation step. More specifically, the shaft 10 is inserted into and fixed in the concave portion of the shaft fixing jig 130 such that a thrust-bearing end of the shaft 10 faces down axially.

In the first press-fitting step, the rotor holder 60 is press-fitted to the shaft 10 such that the opening end of the rotor holder 60 faces down axially.

Referring to FIG. 15, in the second preparation step, the turntable 20 is fixed to a turntable fixing jig 140 in the form of a substantially flat plate such that the surface of the turntable 20 to be in contact with the rotor holder 60 faces up axially.

Referring to FIG. 16, in the adhesive application step, adhesive 16 is applied on an assembly 160 including the shaft 10 and the rotor holder 60 press-fitted to each other in the first press-fitting step. More specifically, the adhesive 16 is applied in the inner recess 12 and the auxiliary groove 14 of the shaft 10 and on the bent portion 64 of the rotor holder 60. The applied adhesive 16 is retained in an adhesive storage formed by the inner recess 12, the auxiliary groove 14, and the bent portion 64 of the rotor holder 60. A portion of the applied adhesive 16 enters between the shaft 10 and the rotor holder 60 fitted to each other by capillary action.

In the second press-fitting step, the assembly 160 with the adhesive 16 applied thereon is press-fitted to the turntable 20. Although the portions on which the adhesive 16 is applied face down axially in this step, the adhesive 16 is retained by surface tension and in the inner recess 12 and the auxiliary groove 14.

Referring to FIG. 17, the assembly 160 of the shaft 10 and the rotor holder 60 is press-fitted to the turntable 20. The outer surface of the shaft 10 and the inner surface of the turntable 20 defining the securing bore 22 are secured to each other by interference fitting. Thus, the adhesive 16 retained in the inner recess 12 and the auxiliary groove 14 is pushed out therefrom by the turntable 20 toward the rotor holder 60 in this step.

Referring to FIG. 18, the lid 62 and the bent portion 64 of the rotor holder 60 are pressed axially downward, and the adhesive 16 is applied on a portion of the outer surface of the shaft 10 between the auxiliary groove 14 and the inner recess 12. Thus, the adhesive 16 is placed between the outer surface of the shaft 10 and the inner surface of the turntable 20 defining the securing bore 22. In addition, due to the force pressing the rotor holder 60, the adhesive 16 is forced between the shaft 10 and the inner surface of the rotor holder 60 defining the fitting bore 78. In this manner, the adhesive 16 spreads throughout between the rotor holder 60 and the shaft 10, thus tightly securing the rotor holder 60 and the shaft 10 to each other.

Moreover, when the assembly 160 is press-fitted to the turntable 20, the pressure inside the adhesive space 18 increases and therefore pushes the adhesive 16 radially outward as shown with arrow in FIG. 18. That is, the adhesive 16 is forced to enter between the lid 62 of the rotor holder 60 and the turntable 20. In this manner, the adhesive 16 spreads throughout between the lid 62 of the rotor holder 60 and the turntable 20. Therefore, the assembly 160 and the turntable 20 are tightly secured to each other.

Furthermore, the adhesive 16 remaining in the inner recess 12 and the auxiliary groove 14 enters into fine gaps between the fitted surfaces and the surfaces in contact of the rotor holder, turntable and shaft, by capillary action. In particular, the adhesive 16 remaining in the auxiliary groove 14 enters between the fitted surfaces on the axially upper side of the turntable 20. In this manner, the adhesive 16 spreads throughout between the fitted surfaces and between the surfaces in contact.

In the solidifying step, the adhesive 16 is solidified. When thermosetting adhesive 16 is used, for example, the adhesive 16 is heated in this step. The heating is carried out while the turntable 20 is located axially below the rotor holder 60. If the heating carried out while the rotor holder 60 is located axially below the turntable 20, a portion of the adhesive 16, which is not solidified, may flow between the fitted surfaces of the shaft 10 and rotor holder 60 and leak to below the extending portion 66. A portion of the shaft 10 located axially below the extending portion 66 of the rotor holder 60 when the rotor holder 60 is on the axially lower side of the turntable 20 is to be inserted into the sleeve 82 so as to form a portion of a bearing. Thus, if the adhesive 16 is solidified around that portion of the shaft 10, the adhesive 16 may affect the operation of the motor 1.

In the post-process step, the preload magnet 68, the cone member 40, and the chucking magnet 50 are attached to the rotating assembly 2.

The preload magnet 68 is secured to the lid 62 by bonding, for example. A sliding agent such as grease is applied between the outer surface of the shaft 10 and a radially inner surface of the cone member 40 defining its opening. The coil spring 32 is disposed between the turntable 20 and the cone member 40 to be freely compressible. The cone member 40 is disposed to be axially slidable relative to the shaft 10. The chucking yoke 52 is press-fitted to the shaft 10 such that the inner circumferential surface of the chucking yoke 52 is secured to the outer surface of the shaft 10.

After the post-process step, the shaft 10 of the rotating assembly 2 is inserted into the sleeve 82 of the stationary assembly 8. In this manner, the motor 1 is assembled.

In the aforementioned preferred embodiments, two grooves for bonding, i.e., the inner recess 12 and the auxiliary groove 14 are provided. However, the number of grooves for bonding is not limited to two. Three or more grooves may be provided. Instead, only the inner recess 12 may be provided.

In the aforementioned preferred embodiments, the securing structure is described as securing the rotor holder 60 and the turntable 20 to the shaft 10 is described. However, application of the securing structure of the present invention is not limited thereto.

In the aforementioned preferred embodiments, securing is achieved between the outer surface of the shaft 10 and the inner surfaces of the turntable 20 and rotor holder 60, between the outer surface of the shaft 10 and the inner surfaces of the turntable 20 and bushing 76, or between the outer surface of the shaft 10 and the inner surface of the turntable 20. However, surfaces to be secured are not limited to the above. For example, securing is achieved only between the outer surface of the shaft 10 and the inner surface of the rotor holder 60 or only between the outer surface of the shaft 10 and the inner surface of the bushing 76.

Although a so-called outer rotor type motor is described in the aforementioned preferred embodiments, the present invention is not limited thereto. The securing structures of the preferred embodiments of the present invention can be applied to a so-called inner rotor type motor and a motor having an axial gap structure.

In the aforementioned preferred embodiments, the radial bearing is formed by an oil-impregnated bearing and the thrust bearing is formed by a pivot bearing. However, the present invention is not limited thereto. Various types of bearings can be employed. From a viewpoint of increasing the strength against an externally applied force such as shear stress, a pivot bearing and a ball bearing are suitable.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
    a shaft coaxial with a center axis, the shaft having an outer surface having an inner recess, the inner recess being concave toward the center axis;
    a rotor magnet rotatable integrally with the shaft;
    a rotor holder having a fitting bore to which the shaft is fitted and including a hollow, approximately cylindrical portion to which the rotor magnet is attached; and
    a chucking device operable to enable attachment and detachment of a disk-shaped storage medium having a center hole, including a turntable disposed axially above the rotor holder, the turntable having a securing bore to which the shaft is fitted and a placement portion on which the disk-shaped storage medium is placed,
    wherein the fitting bore is separated from the securing bore by an outer recess facing the inner recess in a radial direction substantially perpendicular to the center axis, the outer recess being concave away from the center axis, and
    wherein an adhesive is placed in the inner recess and the outer recess.

2. A motor according to claim 1, wherein the outer recess is located on a surface of the rotor holder defining the fitting bore.

3. A motor according to claim 1, wherein the outer recess is located on a surface of the turntable defining the securing bore.

4. A motor according to claim 1, wherein the outer recess is located between an axially upper peripheral portion of a surface of the rotor holder, which defines the fitting bore, and an axially lower peripheral portion of a surface of the turntable, which defines the securing bore.

5. A motor according to claim 4, wherein the surface of the turntable which defines the securing bore is chamfered at an axially lower end.

6. A motor according to claim 4, wherein the rotor holder is a pressed metal member and is provided with a lid having a substantially flat surface which extends between the fitting bore and the hollow,
    the rotor holder has a bent portion between the fitting bore and an upper surface of the flat surface, and
    the adhesive in the outer recess is provided on the bent portion.

7. A motor according to claim 4, wherein a groove serving as an adhesive receiving portion is provided on a surface of the turntable facing the rotor holder.

8. A motor according to claim 4, wherein the chucking device includes:
    a cone member disposed axially above the turntable, to be in contact with a surface of the disk-shaped storage medium defining the center opening, and having an approximately annular inclined surface having a diameter which increases axially downward, the cone member being axially movable to adjust a position of a center of the disk-shaped storage medium and a position of the center axis in a radial direction substantially perpendicular to the center axis;
    an elastic member, disposed axially between the turntable and the cone member, operable to apply an axially upward force to the cone member, and
    a restriction portion, disposed axially above the cone member, operable to restrict axially upward movement of the cone member.

9. A motor according to claim 8, wherein the turntable includes an inner turntable portion having the securing bore and being made of metal, and an outer turntable portion secured to an outer surface of the inner turntable portion, including the placement portion, and being made of resin.

10. A motor according to claim 4, wherein the shaft is secured to at least one of the fitting bore and the securing bore by press fitting.

11. A disk drive incorporating the motor of claim 1, comprising:
    an optical pickup disposed movable in a radial direction substantially perpendicular to the center axis of the motor; and
    a casing surrounding the optical pickup and the motor.

12. A motor comprising:
    a shaft coaxial with a center axis;
    a rotor magnet rotatable integrally with the shaft;
    a rotor holder comprising: a lid having an upper surface; an extending portion radially inside the lid; and an outer cylindrical portion to which the rotor magnet is attached, the extending portion having a fitting bore to which the shaft is fitted, the fitting bore having a first vertical length; and a chucking device operable to enable attachment and detachment of a disk-shaped storage medium having a center hole, the chucking device comprising: a turntable disposed axially above the rotor holder, and a cone member disposed axially above the turntable, wherein the turntable comprises a single piece member comprising: a lower surface; a securing bore to which the shaft is fitted; and an uppermost surface where the disk-shaped storage medium is placed, the securing bore having a second vertical length, wherein the cone member is able to be in contact with a portion of the disk-shaped storage medium defining the center opening, the cone member comprising a through hole for sliding on the shaft, wherein the first vertical length is larger than the second vertical length;

wherein the lower surface of the turntable has a groove, wherein the fitting bore is separated from the securing bore by an outer recess, wherein the upper surface of the lid of the rotor holder is secured to the lower surface of the turntable with the adhesive right under the cone member.

13. A motor according to claim 12, wherein the groove serving as an adhesive receiving portion includes an annular portion and an extending part, the annular portion surrounding the securing bore.

14. A motor according to claim 13, wherein the extending part extends radially outwardly from the annular portion and is circumferentially spaced apart from another extending part.

15. A motor according to claim 12, wherein the chucking device includes:
an elastic member disposed axially between the turntable and the cone member and forcing the cone member axially upward.

16. A disk drive comprising the motor according to claim 12.

17. A motor according to claim 12, wherein the chucking device further comprises a restriction portion disposed axially above the cone member and restricting axially upward movement of the cone member.

18. A motor according to claim 12, wherein the cone member further comprises an annular inclined surface whose diameter increases axially downward.

19. A motor according to claim 12, wherein the groove serving as an adhesive receiving portion comprises an annular portion surrounding the securing bore.

20. A motor according to claim 19, wherein the groove serving as the adhesive receiving portion further comprises an extending part that is radially extended from the annular portion.

21. A motor according to claim 12, wherein the groove serving as an adhesive receiving portion comprises an extending part that is radially extended.

22. A motor according to claim 12, wherein the lower surface of the turntable comprises a flat portion right below the cone member.

23. A motor according to claim 12, wherein an adhesive is included in the groove and the outer recess.

* * * * *